United States Patent
Holtcamp

(10) Patent No.: US 6,958,306 B2
(45) Date of Patent: Oct. 25, 2005

(54) ACTIVATED CATALYST SYSTEMS FROM SUBSTITUTED DIALUMINOXANE COMPLEXES

(75) Inventor: Matthew W. Holtcamp, Huffman, TX (US)

(73) Assignee: Univation Technologies, LLC, Houston, TX (US)

( * ) Notice: Subject to any disclaimer, the term of this patent is extended or adjusted under 35 U.S.C. 154(b) by 12 days.

(21) Appl. No.: 10/650,471

(22) Filed: Aug. 28, 2003

(65) Prior Publication Data

US 2005/0049140 A1 Mar. 3, 2005

(51) Int. Cl.$^7$ .................. C08F 4/64; C08F 4/642
(52) U.S. Cl. .......... 502/128; 502/120; 502/152; 526/129; 526/133; 526/165
(58) Field of Search .................. 502/120, 128, 502/152; 526/129, 133, 165

(56) References Cited

U.S. PATENT DOCUMENTS

| | | | |
|---|---|---|---|
| 4,490,514 A | 12/1984 | Hoff et al. | 526/165 |
| 4,960,878 A | 10/1990 | Crapo et al. | 556/179 |
| 5,602,269 A | 2/1997 | Biagini et al. | 556/170 |
| 5,710,224 A | 1/1998 | Alt et al. | 526/160 |
| 5,712,352 A | 1/1998 | Brant et al. | 526/68 |
| 5,721,185 A | 2/1998 | LaPointe et al. | 502/117 |
| 5,763,547 A | 6/1998 | Kolthammer et al. | 526/129 |
| 5,854,165 A | 12/1998 | Yabunouchi et al. | 502/117 |
| 6,147,174 A | 11/2000 | Holtcamp et al. | 526/160 |
| 6,169,152 B1 | 1/2001 | Sakai | 526/161 |
| 6,420,297 B2 | 7/2002 | Holtcamp | 502/103 |
| 6,441,116 B1 | 8/2002 | Shikuma et al. | 526/348 |
| 6,476,166 B1 | 11/2002 | Holtcamp et al. | 526/160 |
| 6,495,484 B1 | 12/2002 | Holtcamp | 502/152 |
| 6,518,444 B1 | 2/2003 | McConville et al. | 556/52 |
| 2002/0137859 A1 | 9/2002 | Yokota et al. | 526/90 |
| 2003/0017940 A1 | 1/2003 | Kashiwamura et al. | 502/152 |

FOREIGN PATENT DOCUMENTS

| | | | |
|---|---|---|---|
| EP | 0 694 548 A1 | 1/1996 | C07F/5/00 |
| WO | WO 94/07928 | 4/1994 | C08F/10/02 |

OTHER PUBLICATIONS

Eugene You–Zian Chen, Tobin J. Marks, "Cocatalysts for Metal–Catalyzed Olefin Polymerization: Activators, Activation Processes, and Structure–Activity Relationships," Chem. Rev. 2000, 100, pp. 1391–1434.

Primary Examiner—Caixia Lu
(74) Attorney, Agent, or Firm—Kevin M Fulkner

(57) ABSTRACT

A catalyst composition and method for preparing a supported catalyst system for olefin polymerization is provided. In one aspect, the catalyst composition includes a reaction product of a dialuminoxane and a halogen substituted aryl borane, wherein the reaction takes place on a support and at conditions sufficient to exchange one or more ligands on the dialuminoxane for one or more ligands on the halogen substituted aryl borane while on the support. In one embodiment, the method for preparing the supported catalyst system includes combining a dialuminoxane with a support to form a treated catalyst support, and combining a halogen substituted aryl borane with the treated catalyst support at conditions sufficient to exchange one or more ligands on the dialuminoxane for one or more ligands on the halogen substituted aryl borane while on the support to form a supported activator. The method further includes reacting one or more polymerization catalysts with the supported activator.

16 Claims, No Drawings

ACTIVATED CATALYST SYSTEMS FROM SUBSTITUTED DIALUMINOXANE COMPLEXES

BACKGROUND OF THE INVENTION

1. Field of the Invention

Embodiments of the present invention generally relate to the preparation of supported catalysts for olefin polymerization. More particularly, embodiments of the present invention relate to supported dialuminoxane complexes capable of providing stable polymerization catalysts.

2. Description of the Related Art

Polymerization catalyst compounds are typically combined with an activator, also referred to as a co-catalyst, to form compositions having a vacant coordination site that will coordinate, insert, and polymerize olefins. Metallocene polymerization catalysts, for example, are typically activated with aluminoxanes. Aluminoxanes are generally oligomeric compounds containing —Al(R)—O— subunits, where R is an alkyl group. One common and widely used aluminoxane is methylaluminoxane (MAO).

There are several disadvantages to using MAO as an activator, however. First, the synthesis of MAO requires a complicated process. A typical synthesis includes the controlled hydrolysis of trimethylaluminum (TMA). This process must be precisely controlled to reduce losses of aluminum to insoluble species. Second, the starting material TMA is expensive and thus necessarily, the end product MAO is expensive. Third, a huge excess of MAO is needed relative to the metallocene to sufficiently activate the metallocene. Fourth, MAO has very low solubility in aliphatic solvents, which leads to poor storage stability since MAO tends to precipitates out of solution over time. Therefore, MAO is not a cost effective activator due to its problems of low yield, poor solubility, poor storage stability, and expensive reagents.

Alternative activators for metallocenes and other single-site polymerization catalysts have been discovered in recent years. For example, perfluorophenyl aluminum and perfluorophenyl boron complexes have been used. In EP 0 427 697 and EP 0 520 732, trisperfluorophenylborane was described as being capable of abstracting a ligand from cyclopentadienyl derivatives of transition metals while providing a stabilizing, compatible noncoordinating anion. However, the catalyst activity was not impressive.

There is a need, therefore, to provide a simpler method of co-catalyst synthesis and catalyst activation. There is also a need to improve catalyst economics by providing a highly active supported co-catalyst.

SUMMARY OF THE INVENTION

A catalyst composition and method for preparing a supported catalyst system for olefin polymerization is provided. In one aspect, the catalyst composition includes a reaction product of a dialuminoxane and a halogen substituted aryl borane, wherein the reaction takes place on a support and at conditions sufficient to exchange one or more ligands on the dialuminoxane for one or more ligands on the halogen substituted aryl borane while on the support. In one embodiment, the method for preparing the supported catalyst system includes combining a dialuminoxane with a support to form a treated catalyst support, and combining a halogen substituted aryl borane with the treated catalyst support at conditions sufficient to exchange one or more ligands on the dialuminoxane for one or more ligands on the halogen substituted aryl borane while on the support to form a supported activator. The method further includes reacting one or more polymerization catalysts with the supported activator.

In another embodiment, the method for preparing the supported catalyst system includes combining a dialuminoxane with a support to form a treated catalyst support, combining a halogen substituted aryl borane with the treated catalyst support at conditions sufficient to exchange one or more ligands on the dialuminoxane for one or more ligands on the halogen substituted aryl borane while on the support to form a supported activator represented by the formula:

$$Z\{R'—Al—O—Al—R'_n\}$$

wherein Z is a polymeric support, R' is independently selected from an alkyl group having 1–20 carbon atoms and an aryl halogen group, and n is 2. The method further includes reacting one or more polymerization catalysts with the supported activator.

The one or more polymerization catalysts is represented by the formula:

$$Cp^A Cp^B MX_n$$

wherein:

M is a metal atom;

$Cp^A$ and $Cp^B$ are each independently an unsubstituted or substituted cyclic ring group;

X is a leaving group, and n is zero or an integer from 1 to 4.

A method for olefin polymerization is also provided. In one aspect, the method combining a dialuminoxane with a support to form a treated catalyst support, and combining a halogen substituted aryl borane with the treated catalyst support at conditions sufficient to exchange one or more ligands on the dialuminoxane for one or more ligands on the halogen substituted aryl borane while on the support to form a supported activator. The method also includes reacting the supported activator with a polymerization catalyst to form a supported catalyst system, introducing the supported catalyst system and one or more monomers into a reactor, and polymerizing the one or more monomers within the reactor to form a polymer product.

DETAILED DESCRIPTION

A less expensive and cost efficient method for making a catalyst activator containing both aluminum and boron atoms is provided. In one aspect, the catalyst activator is a reaction product of one or more halogen substituted aryl boranes and one or more dialuminoxanes. The reaction of the one or more halogen substituted aryl boranes and the one or more dialuminoxanes takes place on a catalyst support or carrier and takes place at conditions sufficient to facilitate an exchange of ligands on the reagents.

More particularly, the one or more dialuminoxanes are first supported on the catalyst support prior to contact with the one or more halogen substituted aryl boranes. The reaction conditions are such that one or more ligands on the dialuminoxanes are exchanged for one or more ligands on the halogen substituted aryl boranes while on the support. For purposes of this application, the term "supported" means deposited on, contacted with, vaporized with, bonded to, or incorporated within, adsorbed or absorbed in, or on.

The reaction conditions that facilitate the ligand exchange typically include temperatures less than about 250° C. at atmospheric pressure. In one aspect, the reaction temperature is from about 50° C. to about 200° C. In another aspect, the reaction temperature is from about 75° C. to about 150° C. In yet another aspect, the reaction temperature is from about 100° C. to about 130° C.

The one or more halogen substituted aryl boranes are typically added to the one or more dialuminoxanes to yield a particular molar ratio of aluminum atoms to boron atoms. In one aspect, the molar ratio of aluminum atoms to boron atoms is at least 1:1 and up to 100:1. In another aspect, the molar ratio of aluminum atoms to boron atoms is from about 3:1 to about 50:1. In yet another aspect, the molar ratio of aluminum atoms to boron atoms is from about 5:1 to about 25:1.

The one or more halogen substituted aryl boranes may include organoboranes having one or more alkyl, aryl, arylalkyl groups, or any combination thereof attached thereto. Some specific examples include substituted and unsubstituted trialkylboranes and triarylboranes, such as trisperfluorophenylborane, tris(pentafluorophenyl)borane, triphenylborane, tris(2,3,5,6-tetrafluorophenyl)borane, tris(2,3,4,5-tetrafluorophenyl)borane, tris(3,4,5-trifluorophenyl)borane, tris(1,2,2-trifluoroethenyl)borane, phenylbis(perfluorophenyl)borane, tri-n-octylborane, combinations thereof, and derivatives thereof. Preferably, the one or more halogen substituted aryl boranes include trisperfluorophenylborane.

The one or more dialuminoxanes may include oligomeric compounds containing [—Al(R)$_2$—O—]$_n$ or [—(R$_2$—Al)$_2$—O—]$_n$ subunits, where R is an alkyl or cycloalkyl group having 1 to 20 carbon atoms and n is an integer from 1 to 5. Examples of these aluminoxanes include tetraethyldialuminoxane, di-isobutylaluminoxane, di-octylaluminoxane, di-butylaluminoxane, and di-t-butylaluminoxane. There are a variety of methods for preparing dialuminoxane and modified dialuminoxanes, such as the methods described in U.S. Pat. Nos. 4,542,199, 4,960,878, and Eugene You-Xian Chen & Tobin J. Marks, *Cocatalysts for Metal-Catalyzed Olefin Polymerization: Activators, Activation Processes, and Structure-Activity Relationships*, 100 CHEM. REV. 1391–1434 (2000).

In one aspect, the supported catalyst activator is represented by the formula:

Z{R'—Al—O—Al—R'$_n$}     (I)

wherein: Z is a metal/metalloid oxide or polymeric support; R' is independently selected from an alkyl group having 1–20 carbon atoms and an aryl halogen (ArHal) group; and n is 2. Preferably, the aryl halogen group is a halogenated C$_6$ or higher carbon number polycyclic aromatic hydrocarbon or aromatic ring assembly in which two or more rings or fused ring systems are joined directly to one another or together. The use of the terms "halogenated" or "halogenation" for the purposes of this application means that at least one third of hydrogen atoms on carbon atoms of the aryl-substituted aromatic ligands are replaced by halogen atoms, and more preferred that the aromatic ligands be perhalogenated. Examples of aryl groups include phenyl, naphthyl, anthracenyl, and biphenyl radicals. Exemplary halogens include fluorine, bromine, chlorine and iodine. Fluorine is a more preferred halogen.

The term "activator" as used herein refers to any compound or component, or combination of compounds or components, capable of enhancing the ability of a catalyst to polymerize olefin monomers to form polyolefins. The term "catalyst" is used interchangeably with the term "catalyst component", and includes any compound or component, or combination of compounds or components, that is capable of increasing the rate of a chemical reaction, such as the polymerization or oligomerization of one or more olefins. The term "catalyst system" as used herein includes at least one "catalyst" and at least one "activator". The "catalyst system" may also include other components, such as a support for example. The catalyst system may include any number of catalysts in any combination as described herein, as well as any activator in any combination as described herein.

Catalyst Compositions

The catalyst activators described above may be utilized in conjunction with any suitable polymerization catalyst to form the supported catalyst system. Exemplary polymerization catalysts include metallocenes, Group 15 containing compounds, phenoxide transition metal compositions, Group 5 or 6 metal imido complexes, bridged bis(arylamido) Group 4 compounds, derivatives thereof, and combinations thereof. Typically, the mole ratio of the metal of the activator to the metal of the catalyst compound is in the range of between 0.3:1 to 10,000:1, preferably 100:1 to 5000:1, and most preferably 500:1 to 2000:1. Some exemplary polymerization catalysts are discussed in more detail below.

Metallocene Catalyst Compositions

The catalyst system may include at least one metallocene catalyst component. The metallocene catalyst component may include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component is supported on a support material in a particular embodiment as described further below, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are selected from the group consisting of substituted and unsubstituted cyclopentadienyl ligands and ligands isolobal to cyclopentadienyl, non-limiting examples of which in include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind"), substituted versions thereof (as described in more detail below), and heterocyclic versions thereof.

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and a Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In one aspect, the one or more metallocene catalyst components are represented by the formula (II):

$$Cp^A Cp^B MX_n \qquad (II)$$

wherein M is as described above; each X is chemically bonded to M; each Cp group is chemically bonded to M; and n is 0 or an integer from 1 to 4, and either 1 or 2 in a particular embodiment.

The ligands represented by $Cp^A$ and $Cp^B$ in formula (II) may be the same or different cyclopentadienyl ligands or ligands isolobal to cyclopentadienyl, either or both of which may contain heteroatoms and either or both of which may be substitute d by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (II) may be unsubstituted or substituted with any one or combination of substituent groups R. Non-limiting examples of substituent groups R as used in structure (II) include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with formula (II) includes methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in formula (II) is independently selected from the group consisting of, any leaving group in one embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment.

Other non-limiting examples of X groups in formula (II) include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more X's form a part of a fused ring or ring system.

In an other aspect, the metallocene catalyst component includes those of formula (II) where $Cp^A$ and $Cp^B$ are bridged to each other by at least one bridging group, (A), such that the structure is represented by formula (III):

$$Cp^A(A)Cp^B MX_n \qquad (III)$$

These bridged compounds represented by formula (III) are known as "bridged metallocenes". $Cp^A$, $Cp^B$, M, X and n are as defined above for formula (VI); and wherein each Cp ligand is chemically bonded to M, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (II) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $-Si(R')_2Si(R'_2)$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (III) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (II) and (III) are different from each other in one embodiment, and the same in another embodiment.

In yet another aspect, the metallocene catalyst components include mono-ligand metallocene compounds (e.g., mono cyclopentadienyl catalyst components) such as described in WO 93/08221 for example. In this embodiment, the at least one metallocene catalyst component is a bridged "half-sandwich" metallocene represented by the formula (IV):

$$Cp^A(A)QMX_n \qquad (IV)$$

wherein $Cp^A$ is defined above and is bound to M; (A) is a bridging group bonded to Q and $Cp^A$; and wherein an atom from the Q group is bonded to M; and n is 0 or an integer from 1 to 3; 1 or 2 in a particular embodiment. In formula (IV), $Cp^A$, (A) and Q may form a fused ring system. The X groups and n of formula (IV) are as defined above in formula (II) and (III). In one embodiment, $Cp^A$ is selected from the group consisting of cyclopentadienyl, indenyl, tetrahydroindenyl, fluorenyl, substituted versions thereof, and combinations thereof.

In formula (IV), Q is a heteroatom-containing ligand in which the bonding atom (the atom that is bonded with the metal M) is selected from the group consisting of Group 15 atoms and Group 16 atoms in one embodiment, and selected from the group consisting of nitrogen, phosphorus, oxygen or sulfur atom in a more particular embodiment, and nitrogen and oxygen in yet a more particular embodiment. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds comprising Group 15 and Group 16 atoms capable of bonding with M.

In yet another aspect, the at least one metallocene catalyst component is an unbridged "half sandwich" metallocene represented by the formula (V):

$$Cp^A MQ_q X_n \qquad (V)$$

wherein $Cp^A$ is defined as for the Cp groups in (II) and is a ligand that is bonded to M; each Q is independently bonded to M; Q is also bound to $Cp^A$ in one embodiment; X is a leaving group as described above in (II); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (V), Q is selected from the group consisting of $ROO^-$, $RO-$, $R(O)-$, $-NR-$, $-CR_2-$, $-S-$, $-NR_2$, $-CR_3$, $-SR$, $-SiR_3$, $-PR_2$, $-H$, and substituted and unsubstituted aryl groups, wherein R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (III), such as described in, for example, U.S. Pat. No. 6,069,213:

$$Cp^A M(Q_2 GZ)X_n \text{ or } T(Cp^A M(Q_2 GZ)X_n)_m \qquad (VI)$$

wherein M, $Cp^A$, X and n are as defined above;

$Q_2GZ$ forms a polydentate ligand unit (e.g., pivalate), wherein at least one of the Q groups form a bond with M, and is defined such that each Q is independently selected from the group consisting of $-O-$, $-NR-$, $-CR_2-$ and $-S-$; G is either carbon or silicon; and Z is selected from the group consisting of R, —OR, —NR$_2$, —CR$_3$, —SR, —SiR$_3$, —PR$_2$, and hydride, providing that when Q is —NR—, then Z is selected from the group consisting of —OR, —NR$_2$, —SR, —SiR$_3$, —PR$_2$; and provided that neutral valency for Q is satisfied by Z; and wherein each R is independently selected from the group consisting of C$_1$ to C$_{10}$ heteroatom containing groups, C$_1$ to C$_{10}$ alkyls, C$_6$ to C$_{12}$ aryls, C$_6$ to C$_{12}$ alkylaryls, C$_1$ to C$_{10}$ alkoxys, and C$_6$ to C$_{12}$ aryloxys;

n is 1 or 2 in a particular embodiment; and

T is a bridging group selected from the group consisting of C$_1$ to C$_{10}$ alkylenes, C$_6$ to C$_{12}$ arylenes and C, to C$_{10}$ heteroatom containing groups, and C$_6$ to C$_{12}$ heterocyclic groups; wherein each T group bridges adjacent "Cp$^A$M(Q$_2$GZ)X$_n$" groups, and is chemically bonded to the Cp$^A$ groups.

m is an integer from 1 to 7; m is an integer from 2 to 6 in a more particular embodiment.

In another aspect, the at least one metallocene catalyst component can be described more particularly in structures (VIIa), (VIIb), (VIIc), (VIId), (VIIe), and (VIIf):

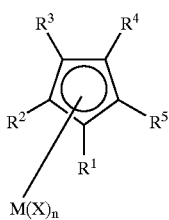
(VIIa-i)

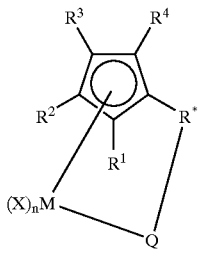
(VIIa-ii)

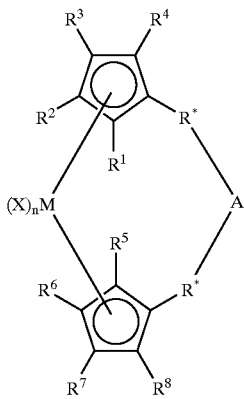
(VIIb)

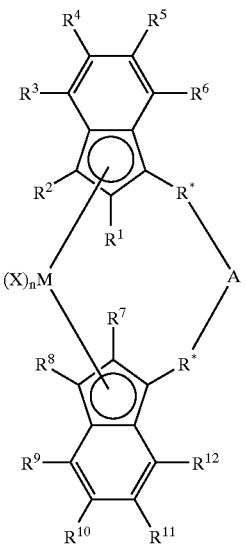
(VIIc)

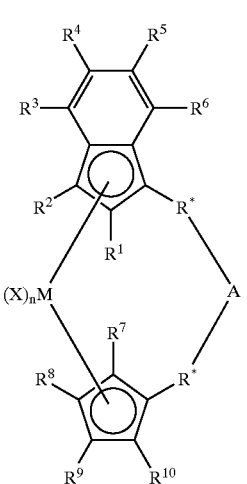
(VIId)

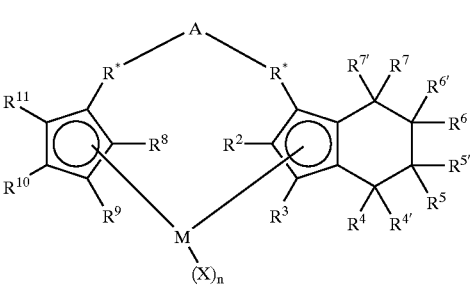
(VIIe)

(VIIf)

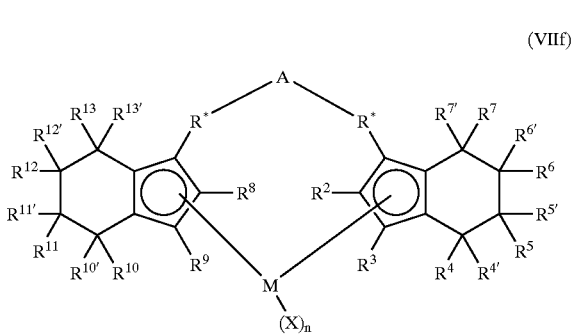

wherein in structures (VIIa) to (VIIf), M is selected from the group consisting of Group 3 to Group 12 atoms, and selected from the group consisting of Group 3 to Group 10 atoms in a more particular embodiment, and selected from the group consisting of Group 3 to Group 6 atoms in yet a more particular embodiment, and selected from the group consisting of Group 4 atoms in yet a more particular embodiment, and selected from the group consisting of Zr and Hf in yet a more particular embodiment; and is Zr in yet a more particular embodiment;

wherein Q in (VIIa) to (VIIf) is selected from the group consisting of alkylenes, aryls, arylenes, alkoxys, aryloxys, amines, arylamines (e.g., pyridyl) alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q comprise from 1 to 20 carbon atoms in one embodiment; and wherein the aromatic groups comprise from 5 to 20 carbon atoms in one embodiment;

wherein each R* is independently: selected from the group consisting of hydrocarbylenes and heteroatom-containing hydrocarbylenes in one embodiment; and selected from the group consisting of alkylenes, substituted alkylenes and heteroatom-containing hydrocarbylenes in another embodiment; and selected from the group consisting of $C_1$ to $C_{12}$ alkylenes, $C_1$ to $C_{12}$ substituted alkylenes, and $C_1$ to $C_{12}$ heteroatom-containing hydrocarbylenes in a more particular embodiment; and selected from the group consisting of $C_1$ to $C_4$ alkylenes in yet a more particular embodiment; and wherein both R* groups are identical in another embodiment in structures (VIIf);

A is as described above for (A) in structure (III), and more particularly, selected from the group consisting of a chemical bond, —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; and selected from the group consisting of $C_5$ to $C_8$ cyclic hydrocarbons, CH$_2$CH$_2$—, =CR$_2$ and =SiR$_2$ in a more particular embodiment; wherein and R is selected from the group consisting of alkyls, cycloalkyls, aryls, alkoxys, fluoroalkyls and heteroatom-containing hydrocarbons in one embodiment; and R is selected from the group consisting of $C_1$ to $C_6$ alkyls, substituted phenyls, phenyl, and $C_1$ to $C_6$ alkoxys in a more particular embodiment; and R is selected from the group consisting of methoxy, methyl, phenoxy, and phenyl in yet a more particular embodiment;

wherein A may be absent in yet another embodiment, in which case each R* is defined as for $R^1$–$R^{13}$;

each X is as described above in (II);

n is an integer from 0 to 4, and from 1 to 3 in another embodiment, and 1 or 2 in yet another embodiment; and $R^1$ through $R^{13}$ are independently: selected from the group consisting of hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroalkyls, and $C_1$ to $C_{12}$ heteroatom-containing hydrocarbons and substituted derivatives thereof in one embodiment; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups in yet a more particular embodiment; wherein adjacent R groups may form a ring, either saturated, partially saturated, or completely saturated.

The structure of the metallocene catalyst component represented by (XIa) may take on many forms such as disclosed in, for example, U.S. Pat. No. 5,026,798, U.S. Pat. No. 5,703,187, and U.S. Pat. No. 5,747,406, including a dimmer or oligomeric structure, such as disclosed in, for example, U.S. Pat. No. 5,026,798 and U.S. Pat. No. 6,069,213.

In a particular embodiment of the metallocene represented in (VIId), $R^1$ and $R^2$ form a conjugated 6-membered carbon ring system that may or may not be substituted.

Non-limiting examples of metallocene catalyst components consistent with the description herein include:
cyclopentadienylzirconium $X_n$,
indenylzirconium $X_n$,
(1-methylindenyl)zirconium $X_n$,
(2-methylindenyl)zirconium $X_n$,
(1-propylindenyl)zirconium $X_n$,
(2-propylindenyl)zirconium $X_n$,
(1-butylindenyl)zirconium $X_n$,
(2-butylindenyl)zirconium $X_n$,
(methylcyclopentadienyl)zirconium $X_n$,
tetrahydroindenylzirconium $X_n$,
(pentamethylcyclopentadienyl)zirconium $X_n$,
cyclopentadienylzirconium $X_n$,
pentamethylcyclopentadienyltitanium $X_n$,
tetramethylcyclopentyltitanium $X_n$,
1,2,4-trimethylcyclopentadienylzirconium $X_n$,
dimethylsilyl(1,2,3,4-tetramethylcyclopentadienyl) (cyclopentadienyl)zirconium $X_n$,
dimethylsilyl(1,2,3,4-tetramethylcyclopentadienyl)(1,2,3-trimethyl-cyclopentadienyl)zirconium $X_n$,
dimethylsilyl(1,2,3,4-tetramethylcyclopentadienyl)(1,2-dimethyl-cyclopentadienyl)zirconium $X_n$,
dimethylsilyl(1,2,3,4-tetramethyl-cyclopentadienyl)(2-methylcyclopentadienyl)zirconium $X_n$,
dimethylsilyl(cyclopentadienyl)(indenyl)zirconium $X_n$, dimethylsilyl(2-methylindenyl)(fluorenyl)zirconium $X_n$,
diphenylsiyl(1,2,3,4-tetramethyl-cyclopentadienyl)(3-propylcyclopentadienyl)zirconium $X_n$,
dimethylsilyl(1,2,3,4-tetramethylcyclopentadienyl)(3-t-butylcyclopentadienyl)zirconium $X_n$,
dimethylgermyl(1,2-dimethylcyclopentadienyl)(3-isopropylcyclopentadienyl)zirconium $X_n$,
dimethylsilyl(1,2,3,4-tetramethyl-cyclopentadienyl)(3-methylcyclopentadienyl)zirconium $X_n$,
diphenylmethylidene(cyclopentadienyl)(9-fluorenyl) zirconium $X_n$,
diphenylmethylidene(cyclopentadienyl)(indenyl)zirconium $X_n$,
iso-propylidenebis(cyclopentadienyl)zirconium $X_n$,
iso-propylidene(cyclopentadienyl)(9-fluorenyl)zirconium $X_n$,
iso-propylidene(3-methylcyclopentadienyl)(9-fluorenyl) zirconium $X_n$,
ethylenebis(9-fluorenyl)zirconium $X_n$,
meso-ethylenebis(1-indenyl)zirconium $X_n$,
ethylenebis(1-indenyl)zirconium $X_n$,
ethylenebis(2-methyl-1-indenyl)zirconium $X_n$,
ethylenebis(2-methyl-4,5,6,7-tetrahydro-1-indenyl) zirconium $X_n$,
ethylenebis(2-propyl-4,5,6,7-tetrahydro-1-indenyl) zirconium $X_n$,
ethylenebis(2-isopropyl-4,5,6,7-tetrahydro-1-indenyl) zirconium $X_n$,
ethylenebis(2-butyl-4,5,6,7-tetrahydro-1-indenyl)zirconium $X_n$,
ethylenebis(2-isobutyl-4,5,6,7-tetrahydro-1-indenyl) zirconium $X_n$,
dimethyl silyl(4,5,6,7-tetrahydro-1-indenyl)zirconium $X_n$,
diphenyl(4,5,6,7-tetrahydro-1-indenyl)zirconium $X_n$,
ethylenebis(4,5,6,7-tetrahydro-1-indenyl)zirconium $X_n$,
dimethylsilylbis(cyclopentadienyl)zirconium $X_n$,
dimethylsilylbis(9-fluorenyl)zirconium $X_n$,
dimethylsilylbis(1-indenyl)zirconium $X_n$,
dimethylsilylbis(2-methylindenyl)zirconium $X_n$,
dimethylsilylbis(2-propylindenyl)zirconium $X_n$,
dimethylsilylbis(2-butylindenyl)zirconium $X_n$,
diphenylsilylbis(2-methylindenyl)zirconium $X_n$,
diphenylsilylbis(2-propylindenyl)zirconium $X_n$,
diphenylsilylbis(2-butylindenyl)zirconium $X_n$,
dimethylgermylbis(2-methylindenyl)zirconium $X_n$,
dimethylsilylbis(tetrahydroindenyl)zirconium $X_n$,
dimethylsilylbis(tetramethylcyclopentadienyl)zirconium $X_n$,
dimethylsilyl(cyclopentadienyl)(9-fluorenyl)zirconium $X_n$,
diphenylsilyl(cyclopentadienyl)(9-fluorenyl)zirconium $X_n$,
diphenylsilylbis(indenyl)zirconium $X_n$,
cyclotrimethylenesilyl(tetramethylcyclopentadienyl) (cyclopentadienyl)zirconium
cyclotetramethylenesilyl(tetramethylcyclopentadienyl) (cyclopentadienyl) $X_n$,
cyclotrimethylenesilyl(tetramethylcyclopentadienyl)(2-methylindenyl)zirconium
cyclotrimethylenesilyl(tetramethylcyclopentadienyl)(3-methylcyclopentadienyl)zirconium $X_n$,
cyclotrimethylenesilylbis(2-methylindenyl)zirconium $X_n$,
cyclotrimethylenesilyl(tetramethylcyclopentadienyl)(2,3,5-trimethylcyclopentadienyl)zirconium $X_n$,
cyclotrimethylenesilylbis(tetramethylcyclopentadienyl) zirconium $X_n$,
bis(cyclopentadienyl)chromium $X_n$,
bis(cyclopentadienyl)zirconium $X_n$,
bis(n-butylcyclopentadienyl)zirconium $X_n$,
bis(n-dodecyclcyclopentadienyl)zirconium $X_n$,
bis(ethylcyclopentadienyl)zirconium $X_n$,
bis(iso-butylcyclopentadienyl)zirconium $X_n$,
bis(iso-propylcyclopentadienyl)zirconium $X_n$,
bis(methylcyclopentadienyl) zirconium $X_n$,
bis(n-oxtylcyclopentadienyl)zirconium $X_n$,
bis(n-pentylcyclopentadienyl)zirconium $X_n$,
bis(n-propylcyclopentadienyl)zirconium $X_n$,
bis(trimethylsilylcyclopentadienyl)zirconium $X_n$,
bis(1,3-bis(trimethylsilyl)cyclopentadienyl)zirconium $X_n$,
bis(1-ethyl-2-methylcyclopentadienyl)zirconium $X_n$,
bis(1-ethyl-3-methylcyclopentadienyl)zirconium $X_n$,
bis(pentamethylcyclopentadienyl)zirconium $X_n$,
bis(pentamethylcyclopentadienyl)zirconium $X_n$,
bis(1-propyl-3-methylcyclopentadienyl)zirconium $X_n$,
bis(1-n-butyl-3-methylcyclopentadienyl)zirconium $X_n$,
bis(1-isobutyl-3-methyl cyclopentadienyl) zirconium $X_n$,
bis(1-propyl-3-butylcyclopentadienyl)zirconium $X_n$,
bis(1,3-n-butylcyclopentadienyl)zirconium $X_n$,
bis(4,7-dimethylindenyl)zirconium $X_n$,
bis(indenyl)zirconium $X_n$,
bis(2-methylindenyl)zirconium $X_n$,
cyclopentadienylindenylzirconium $X_n$,
bis(n-propylcyclopentadienyl)hafnium $X_n$,
bis(n-butylcyclopentadienyl)hafnium $X_n$,
bis(n-pentylcyclopentadienyl)hafnium $X_n$,
bis(n-propyl cyclopentadienyl)(n-butyl cyclopentadienyl) hafnium $X_n$,
bis(2-trimethylsilylethyl)cyclopentadienyl)hafnium $X_n$,
bis(trimethylsilyl cyclopentadienyl)hafnium $X_n$,
bis(2-n-propylindenyl)hafnium $X_n$,
bis(2-n-butylindenyl)hafnium $X_n$,
dimethylsilylbis(n-propylcyclopentadienyl)hafnium $X_n$,
dimethylsilylbis(n-butylcyclopentadienyl)hafnium $X_n$,
bis(9-n-propylfluorenyl)hafnium $X_n$,
bis(9-n-butylfluorenyl)hafnium $X_n$,
(9-n-propylfluorenyl)(2-n-propylindenyl)hafnium $X_n$,
bis(1-n-propyl-2-methylcyclopentadienyl)hafnium $X_n$,
(n-propylcyclopentadienyl)(1-n-propyl-3-n-butylcyclopentadienyl)hafnium $X_n$,
dimethylsilyl(tetramethylcyclopentadienyl) (cyclopropylamido)titanium $X_n$,
dimethylsilyl(tetramethylcyclopentadienyl) (cyclobutylamido)titanium $X_n$,
dimethylsilyl(tetramethylcyclopentadienyl) (cyclopentylamido)titanium $X_n$,
dimethylsilyl(tetramethylcyclopentadienyl) (cyclohexylamido)titanium $X_n$,
dimethylsilyl(tetramethylcyclopentadienyl) (cycloheptylamido)titanium $X_n$,
dimethylsilyl(tetramethylcyclopentadienyl) (cyclooctylamido)titanium $X_n$,
dimethylsilyl(tetramethylcyclopentadienyl) (cyclononylamido)titanium $X_n$,
dimethylsilyl(tetramethylcyclopentadienyl) (cyclodecylamido)titanium $X_n$,
dimethylsilyl(tetramethylcyclopentadienyl) (cycloundecylamido)titanium $X_n$,
dimethylsilyl(tetramethylcyclopentadienyl) (cyclododecylamido)titanium $X_n$,
dimethylsilyl(tetramethylcyclopentadienyl)(sec-butylamido)titanium $X_n$,
dimethylsilyl(tetramethylcyclopentadienyl)(n-octylamido) titanium $X_n$,
dimethylsilyl(tetramethylcyclopentadienyl)(n-decylamido) titanium $X_n$,
dimethylsilyl(tetramethylcyclopentadienyl)(n-octadecylamido)titanium $X_n$, methylphenylsilyl(tetramethylcyclopentadienyl)(cyclopropyl amido)titanium $X_n$,
methylphenylsilyl(tetramethylcyclopentadienyl)(cyclobutylamido)titanium $X_n$,
methylphenylsilyl(tetramethylcyclopentadienyl)(cyclopentylamido)titanium $X_n$,
methylphenylsilyl(tetramethylcyclopentadienyl)(cyclohexylamido)titanium $X_n$,
methylphenylsilyl(tetramethylcyclopentadienyl)(cycloheptylamido)titanium $X_n$,
methylphenylsilyl(tetramethylcyclopentadienyl)(cyclooctylamido)titanium $X_n$,
methylphenylsilyl(tetramethylcyclopentadienyl)(cyclononylamido)titanium $X_n$,
methylphenylsilyl(tetramethylcyclopentadienyl)(cyclodecylamido)titanium, $X_n$,
methylphenylsilyl(tetramethylcyclopentadienyl)(cycloundecylamido)titanium $X_n$,
methylphenylsilyl(tetramethylcyclopentadienyl)(cyclododecylamido)titanium $X_n$,
methylphenylsilyl(tetramethylcyclopentadienyl)(sec-butylamido)titanium $X_n$,
methylphenylsilyl(tetramethylcyclopentadienyl)(n-octylamido)titanium $X_n$,
methylphenylsilyl(tetramethylcyclopentadienyl)(n-decylamido)titanium $X_n$,
methylphenylsilyl(tetramethylcyclopentadienyl)(n-octadecylamido)titanium $X_n$,
diphenylsilyl(tetramethylcyclopentadienyl)(cyclopropylamido)titanium $X_n$,
diphenylsilyl(tetramethylcyclopentadienyl)(cyclobutylamido)titanium $X_n$,
diphenylsilyl(tetramethylcyclopentadienyl)(cyclopentylamido)titanium $X_n$,
diphenylsilyl(tetramethylcyclopentadienyl)(cyclohexylamido)titanium $X_n$,
diphenylsilyl(tetramethylcyclopentadienyl)(cycloheptylamido)titanium $X_n$,
diphenylsilyl(tetramethylcyclopentadienyl)(cyclooctylamido)titanium $X_n$,
diphenylsilyl(tetramethylcyclopentadienyl)(cyclononylamido)titanium $X_n$,
diphenylsilyl(tetramethylcyclopentadienyl)(cyclodecylamido)titanium $X_n$,
diphenylsilyl(tetramethylcyclopentadienyl)(cycloundecylamido)titanium $X_n$,
diphenylsilyl(tetramethylcyclopentadienyl)(cyclododecylamido)titanium $X_n$,
diphenylsilyl(tetramethylcyclopentadienyl)(sec-butylamido)titanium $X_n$,
diphenylsilyl(tetramethylcyclopentadienyl)(n-octylamido) titanium $X_n$,
diphenylsilyl(tetramethylcyclopentadienyl)(n-decylamido) titanium $X_n$,
diphenylsilyl (tetramethylcyclopentadienyl)(n-octadecylamido)titanium $X_n$,
and derivatives thereof.

By "derivatives thereof", it is meant any substitution or ring formation as described above; and in particular, replacement of the metal "M" (Cr, Zr, Ti or Hf) with an atom selected from the group consisting of Cr, Zr, Hf and Ti; and replacement of the "X" group with any of $C_1$ to $C_5$ alkyls, $C_6$ aryls, $C_6$ to $C_{10}$ alkylaryls, fluorine or chlorine; n is 1, 2 or 3.

It is contemplated that the metallocene catalysts components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components.

The "metallocene catalyst component" may comprise any combination of any "embodiment" described herein.

Group 15-Containing Catalyst Compositions

"Group 15-containing catalyst components", as referred to herein, include Group to Group 12 metal complexes, wherein the metal is 2 to 4 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 98/46651, WO 99/01460; EP A1 0 893, 454; EP A1 0 894 005; U.S. Pat. No. 5,318,935; U.S. Pat. No. 5,889,128 U.S. Pat. No. 6,333,389 B2 and U.S. Pat. No. 6,271,325 B1.

In one embodiment, the Group 15-containing catalyst components may include Group 4 imino-phenol complexes, Group 4 bis(amide) complexes, and Group 4 pyridyl-amide complexes that are active towards olefin polymerization to any extent.

The Group 15-containing catalyst component may be more particularly described by the following formula (VIII):

$$\alpha_a\beta_b\gamma_gMX_n \qquad (VIII)$$

wherein β and γ are groups that each comprise at least one Group 14 to Group 16 atom; and β (when present) and γ are groups bonded to M through between 2 and 6 Group 14 to Group 16 atoms, at least two atoms being Group 14-containing atoms.

More particularly, β and γ are groups selected from Group 14 and Group 15-containing: alkyls, aryls, alkylaryls, and heterocyclic hydrocarbons, and chemically bonded combinations thereof in one embodiment; and selected from Group 14 and Group 15-containing: $C_1$ to $C_{10}$ alkyls, $C_6$ to $C_{12}$ aryls, $C_6$ to $C_{18}$ alkylaryls, and $C_4$ to $C_{12}$ heterocyclic hydrocarbons, and chemically bonded combinations thereof in a more particular embodiment; and selected from $C_1$ to $C_{10}$ alkylamines, $C_1$ to $C_{10}$ alkoxys, $C_6$ to $C_{20}$ alkylarylamines, $C_6$ to $C_{18}$ alkylaryloxys, and $C_4$ to $C_{12}$ nitrogen containing heterocyclic hydrocarbons, and $C_4$ to $C_{12}$ alkyl substituted nitrogen containing heterocyclic hydrocarbons and chemically bonded combinations thereof in yet a more particular embodiment; and selected from anilinyls, pyridyls, quinolyls, pyrrolyls, pyrimidyls, purinyls, imidazyls, indolyls, $C_1$ to $C_6$ alkyl substituted groups selected from anilinyls, pyridyls, quinolyls, pyrrolyls, pyrimidyls, purinyls, imidazyls, indolyls; $C_1$ to $C_6$ alkylamine substituted groups selected from anilinyls, pyridyls, quinolyls, pyrrolyls, pyrimidyls, purinyls, imidazyls, indolyls, amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, and chemically bonded combinations thereof in yet a more particular embodiment;

α is a linking (or "bridging") moiety that, when present, forms a chemical bond to each of β and γ, or two γ's, thus forming a "γαγ" or "γαβ" ligand bound to M; α may also comprise a Group 14 to Group 16 atom which may be bonded to M through the Group 14 to Group 16 atom in one embodiment; and more particularly, a is a divalent bridging group selected from alkylenes, arylenes, alkenylenes, heterocyclic arylenes, alkylarylenes, heteroatom containing alkylenes, heteroatom containing alkenylenes and heterocyclic hydrocarbonylenes in one embodiment; and selected from $C_1$ to $C_{10}$ alkylenes, $C_2$ to $C_{10}$ alkenylenes, $C_6$ to $C_{12}$ arylenes, $C_1$ to $C_{10}$ divalent ethers, $C_6$ to $C_{12}$ O- or N-containing arylenes, $C_2$ to $C_{10}$ alkyleneamines, $C_6$ to $C_{12}$ aryleneamines, and substituted derivatives thereof in yet a more particular embodiment;

a is an integer from 0 to 2; a is either 0 or 1 in a more particular embodiment; and a is 1 in yet a more particular embodiment; b is an integer from 0 to 2; g is an integer from 1 to 2; wherein in one embodiment, a is 1, b is 0 and g is 2; M is selected from Group 3 to Group 12 atoms in one embodiment; and selected from Group 3 to Group 10 atoms in a more particular embodiment; and selected from Group 3 to Group 6 atoms in yet a more particular embodiment; and selected from Ni, Cr, Ti, Zr and Hf in yet a more particular embodiment; and selected from Zr and Hf in yet a more particular embodiment; each X is as defined above; and n is an integer from 0 to 4 in one embodiment; and an integer from 1 to 3 in a more particular embodiment; and an integer from 2 to 3 in yet a more particular embodiment.

As used herein, "chemically bonded combinations thereof" means that adjacent groups, (β and γ groups) may form a chemical bond between them; in one embodiment, the β and γ groups are chemically bonded through one or more a groups there between.

As used herein, the terms "alkyleneamines", "aryleneamines", describe alkylamines and arylamines (respectively) that are deficient by two hydrogens, thus forming chemical bonds with two adjacent γ groups, or adjacent β and γ groups. Thus, an example of an alkyleneamine is —$CH_2CH_2N(CH_3)CH_2CH_2$, and an example of a heterocyclic hydrocarbylene or aryleneamine is —$CH_5H_3N$— (divalent pyridine). An "alkylene-arylamine" is a group such as, for example, —$CH_2CH_2(C_5H_3N)CH_2CH_2$—.

Described another way, the Group 15-containing catalyst component is represented by the structures (IX) and (X):

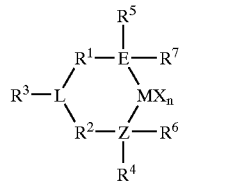
(IX)

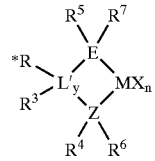
(X)

wherein E and Z are Group 15 elements independently selected from nitrogen and phosphorus in one embodiment; and nitrogen in a more particular embodiment;

L is selected from Group 15 atoms, Group 16 atoms, Group 15-containing hydrocarbylenes and a Group 16 containing hydrocarbylenes in one embodiment; wherein $R^3$ is absent when L is a Group 16 atom; in yet a more particular embodiment, when $R^3$ is absent, L is selected from heterocyclic hydrocarbylenes; and in yet a more particular embodiment, L is selected from nitrogen, phosphorous, anilinyls, pyridyls, quinolyls, pyrrolyls, pyrimidyls, purinyls, imidazyls, indolyls; $C_1$ to $C_6$ alkyl substituted groups selected from anilinyls, pyridyls, quinolyls, pyrrolyls, pyrimidyls, purinyls, imidazyls, and indolyls; $C_1$ to $C_6$ alkylamine substituted groups selected from anilinyls, pyridyls, quinolyls, pyrrolyls, pyrimidyls, purinyls, imidazyls, indolyls; amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, substituted derivatives thereof, and chemically bonded combinations thereof;

L' is selected from Group 15 atoms, Group 16 atoms, and Group 14 atoms in one embodiment; and selected from Group 15 and Group 16 atoms in a more particular embodiment; and is selected from groups as defined by L above in yet a more particular embodiment, wherein "EZL" and "EZL'" may be referred to as a "ligand", the EZL and EZL' ligands comprising the R* and $R^1$–$R^7$ groups;

wherein L and L' may or may not form a bond with M;

y is an integer ranging from 0 to 2 (when y is 0, group L', *R and $R^3$ are absent);

M is selected from Group 3 to Group 5 atoms, Group 4 atoms in a more particular embodiment, and selected from Zr and Hf in yet a more particular embodiment;

n is an integer ranging from 1 to 4 in one embodiment; n is an integer ranging from 2 to 3 in a more particular embodiment;

each X is as defined above;

$R^1$ and $R^2$ are independently: divalent bridging groups selected from alkylenes, arylenes, heteroatom containing alkylenes, heteroatom containing arylenes, substituted alkylenes, substituted arylenes and substituted heteroatom containing alkylenes, wherein the heteroatom is selected from silicon, oxygen, nitrogen, germanium, phosphorous, boron and sulfur in one embodiment; selected from $C_1$ to $C_{20}$ alkylenes, $C_6$ to $C_{12}$ arylenes, heteroatom-containing $C_1$ to $C_{20}$ alkylenes and heteroatom-containing $C_6$ to $C_{12}$ arylenes in a more particular embodiment; and in yet a more particular embodiment selected from —$CH_2$—, —$C(CH_3)_2$—, $C(C_6H_5)_2$—, $CH_2CH_2$—, $CH_2CH_2CH_2$—, —$Si(CH_3)_2$—, —$Si(C_6H_5)_2$—, $C_6H_{10}$—, —$C_6H_4$—, and substituted derivatives thereof, the substitutions including $C_1$ to $C_4$ alkyls, phenyl, and halogen radicals;

$R^3$ is absent in one embodiment; a group selected from hydrocarbyl groups, hydrogen radical, halogen radicals, and heteroatom-containing groups in a more particular embodiment; and selected from linear alkyls, cyclic alkyls, and branched alkyls having 1 to carbon atoms in yet a more particular embodiment;

*R is absent in one embodiment; a group selected from hydrogen radical, Group 14 atom containing groups, halogen radicals, and a heteroatom-containing groups in yet a more particular embodiment;

$R^4$ and $R^5$ are independently: groups selected from alkyls, aryls, substituted aryls, cyclic alkyls, substituted cyclic alkyls, cyclic arylalkyls, substituted cyclic arylalkyls and multiple ring systems in one embodiment, each group having up to 20 carbon atoms, and between 3 and 10 carbon atoms in a more particular embodiment; selected from $C_1$ to $C_{20}$ alkyls, $C_1$ to $C_{20}$ aryls, $C_1$ to $C_{20}$ arylalkyls, and heteroatom-containing groups (for example $PR_3$, where R is an alkyl group) in yet a more particular embodiment; and $R^6$ and $R^7$ are independently: absent in one embodiment; groups selected from hydrogen radicals, halogen radicals, heteroatom-containing groups and hydrocarbyls in a more particular embodiment; selected from linear, cyclic and branched alkyls having from 1 to 20 carbon atoms in yet a more particular embodiment;

wherein $R^1$ and $R^2$ may be associated with one another, and/or $R^4$ and $R^5$ may be associated with one another as through a chemical bond.

Described yet more particularly, the Group 15-containing catalyst component can be described as the embodiments shown in structures (XI), (XII) and (XIII) (where "N" is nitrogen):

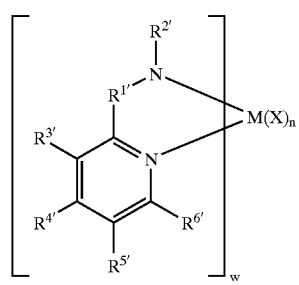

(XI)

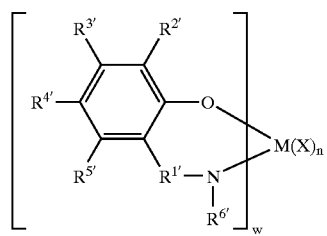

(XII)

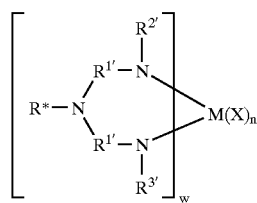

(XIII)

wherein structure (XI) represents pyridyl-amide structures, structure (XII) represents imino-phenol structures, and structure (XIII) represents bis(amide) structures; wherein w is an integer from 1 to 3, and 1 or 2 in a more particular embodiment, and 1 in yet a more particular embodiment; M is a Group 3 to Group 13 element, a Group 3 to Group 6 element in a more particular embodiment, and a Group 4 element in yet a more particular embodiment; each X is independently selected from hydrogen radicals, halogen ions (desirably, anions of fluorine, chlorine, and bromine); $C_1$ to $C_6$ alkyls; $C_1$ to $C_6$ fluoroalkyls, $C_6$ to $C_{12}$ aryls; $C_6$ to $C_{12}$ fluoroalkyls, $C_1$ to $C_6$ alkoxys, $C_6$ to $C_{12}$ aryloxys, and $C_7$ to $C_{18}$ alkylaryloxys; n is an integer ranging from 0 to 4, and from 1 to 3 in a more particular embodiment, and from 2 to 3 in yet a more particular embodiment, and 2 in yet a more particular embodiment;

and further, wherein in structures (XI), (XII), and (XIII), $R^{1\prime}$ is selected from hydrocarbylenes and heteroatom-containing hydrocarbylenes in one embodiment, and selected from $-SiR_2-$, alkylenes, arylenes, alkenylenes and substituted alkylenes, substituted alkenylenes and substituted arylenes in another embodiment; and selected from $-SiR_2-$, $C_1$ to $C_6$ alkylenes, $C_6$ to $C_{12}$ arylenes, $C_1$ to $C_6$ substituted alkylenes and $C_6$ to $C_{12}$ substituted arylenes in another embodiment, wherein R is selected from $C_1$ to $C_6$ alkyls and $C_6$ to $C_{12}$ aryls; and $R^{2\prime}$, $R^{3\prime}$, $R^{4\prime}$, $R^{5\prime}$, $R^{6\prime}$ and $R^*$ are independently selected from hydride, $C_1$ to $C_{10}$ alkyls, $C_6$ to $C_{12}$ aryls, $C_6$ to $C_{18}$ alkylaryls, $C_4$ to $C_{12}$ heterocyclic hydrocarbyls, substituted $C_1$ to $C_{10}$ alkyls, substituted $C_6$ to $C_{12}$ aryls, substituted $C_6$ to $C_{18}$ alkylaryls, and substituted $C_4$ to $C_{12}$ heterocyclic hydrocarbyls and chemically bonded combinations thereof in one embodiment; wherein $R^*$ is absent in a particular embodiment; and in another embodiment, $R^*-N$ represents a nitrogen containing group or ring such as a pyridyl group or a substituted pyridyl group that is bridged by the $R^{1\prime}$ groups. In yet another embodiment, $R^*-N$ is absent, and the $R^{1\prime}$ groups form a chemical bond to one another.

In one embodiment of structures (XI), (XII), and (XIII), $R^{1\prime}$ is selected from methylene, ethylene, 1-propylene, 2-propylene, $=Si(CH_3)_2$, $=Si(phenyl)_2$, $-CH=$, $-C(CH_3)=$, $-C(phenyl)_2-$, $-C(phenyl)=$ (wherein "=" represents two chemical bonds), and the like.

In a particular embodiment of structure (XII), $R^{2\prime}$ and $R^{4\prime}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 2-methyl-4-chlorophenyl, 2-n-propyl-4-chlorophenyl, 2-iso-propyl-4-chlorophenyl, 2-iso-butyl-4-chlorophenyl, 2-tert-butyl-4-chlorophenyl, 2-methyl-4-fluorophenyl, 2-n-propyl-4-fluorophenyl, 2-iso-propyl-4-fluorophenyl, 2-iso-butyl-4-fluorophenyl, 2-tert-butyl-4-fluorophenyl, 2-methyl-4-bromophenyl, 2-n-propyl-4-bromophenyl, 2-iso-propyl-4-bromophenyl, 2-iso-butyl-4-bromophenyl, 2-tert-butyl-4-bromophenyl, and the like.

In yet another particular embodiment of structures (XI) and (XIII), $R^{2\prime}$ and $R^{3\prime}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 4-methylphenyl, 4-n-propylphenyl, 4-iso-propylphenyl, 4-iso-butylphenyl, 4-tert-butylphenyl, 4-fluorophenyl, 4-chlorophenyl, 4-bromophenyl, 6-methylphenyl, 6-n-propylphenyl, 6-iso-propylphenyl, 6-iso-butylphenyl, 6-tert-butylphenyl, 6-fluorophenyl, 6-chlorophenyl, 6-bromophenyl, 2,6-dimethylphenyl, 2,6-di-n-propylphenyl, 2,6-di-iso-propylphenyl, 2,6-di-isobutylphenyl, 2,6-di-tert-butylphenyl, 2,6-difluorophenyl, 2,6-dichlorophenyl, 2,6-dibromophenyl, 2,4,6-trimethylphenyl, 2,4,6-tri-n-propylphenyl, 2,4,6-tri-iso-propylphenyl, 2,4,6-tri-iso-butylphenyl, 2,4,6-tri-tert-butylphenyl, 2,4,6-trifluorophenyl, 2,4,6-trichlorophenyl, 2,4,6-tribromophenyl, 2,3,4,5,6-pentafluorophenyl, 2,3,4,5,6-pentachlorophenyl, 2,3,4,5,6-pentabromophenyl, and the like.

In another embodiment of structures (XI), (XII), and (XIII), X is independently selectively from fluoride, chloride, bromide, methyl, ethyl, phenyl, benzyl, phenyloxy, benzloxy, 2-phenyl-2-propoxy, 1-phenyl-2-propoxy, 1-phenyl-2-butoxy, 2-phenyl-2-butoxy and the like.

As used herein, "chemically bonded combinations" means that adjacent groups may chemical bond between them, thus forming a ring system, either saturated, unsaturated, or aromatic.

Non-limiting examples of the Group 15-containing catalyst component are represented by the structures (XIVa)–(XIVf) (where "N" is nitrogen):

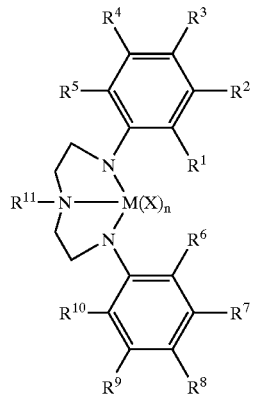

(XIVa)

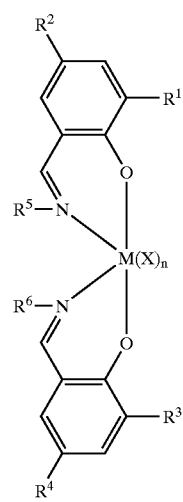

(XIVb)

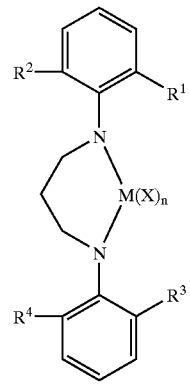

(XIVc)

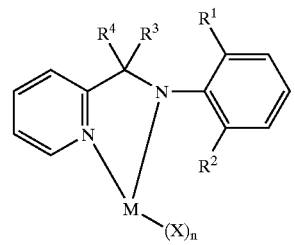

(XIVd)

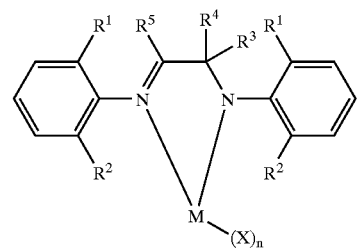

(XIVe)

(XIVf)

wherein in structures (XIVa) through (XIVf) M is selected from Group 4 atoms in one embodiment; and M is selected from Zr and Hf in a more particular embodiment; and wherein $R^1$ through $R^{11}$ in structures (XIVa) through (XIVf) are selected from hydride, fluorine radical, chlorine radical, bromine radical, methyl, ethyl, n-propyl, isopropyl, n-butyl, isobutyl, tert-butyl and phenyl; and X is selected from fluorine ion, chlorine ion, bromine ion, methyl, phenyl, benzyl, phenyloxy and benzyloxy; and n is an integer ranging from 0 to 4, and from 2 to 3 in a more particular embodiment.

The Group 15-containing catalyst components are prepared by methods known in the art such as those disclosed in, for example, EP 0 893 454 A1, U.S. Pat. No. 5,889,128, U.S. Pat. No. 6,333,389 B2 and WO 00/37511.

The "Group 15-containing catalyst component" may comprise any combination of any "embodiment" described herein.

Phenoxide Transition Metal Catalyst Compositions

Phenoxide transition metal catalyst compositions are heteroatom substituted phenoxide ligated Group 3 to 10 transition metal or lanthanide metal compounds wherein the metal is bound to the oxygen of the phenoxide group. Phenoxide transition metal catalyst compounds may be represented by Formula XV or XVI:

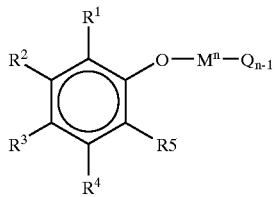

(XV)

or

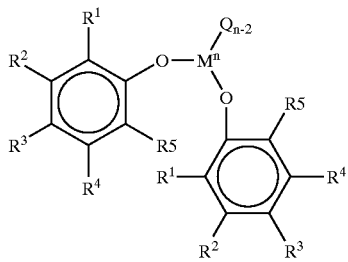

(XVI)

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M;

at least one of $R^2$ to $R^5$ is a heteroatom containing group, the rest of $R^2$ to $R^5$ are independently hydrogen or a $C_1$ to $C_{100}$ group, preferably a $C_4$ to $C_{20}$ alkyl group, preferred examples of which include butyl, isobutyl, t-butyl, pentyl, hexyl, heptyl, isohexyl, octyl, isooctyl, decyl, nonyl, dodecyl, and any of $R^2$ to $R^5$ also may or may not be bound to M;

Each $R^1$ to $R^5$ group may be independently substituted or unsubstituted with other atoms, including heteroatoms or heteroatom containing group(s);

O is oxygen;

M is a Group 3 to Group 10 transition metal or lanthanide metal, preferably a Group 4 metal, preferably M is Ti, Zr or Hf;

n is the valence state of the metal M, preferably 2, 3, 4, or 5; and

Q is, and each Q may be independently be, an alkyl, halogen, benzyl, amide, carboxylate, carbamate, thiolate, hydride or alkoxide group, or a bond to an R group containing a heteroatom which may be any of $R^1$ to $R^5$.

A heteroatom containing group may be any heteroatom or a heteroatom bound to carbon, silicon or another heteroatom. Preferred heteroatoms include boron, aluminum, silicon, nitrogen, phosphorus, arsenic, tin, lead, antimony, oxygen, selenium, and tellurium. Particularly preferred heteroatoms include nitrogen, oxygen, phosphorus, and sulfur. Even more particularly preferred heteroatoms include nitrogen and oxygen. The heteroatom itself may be directly bound to the phenoxide ring or it may be bound to another atom or atoms that are bound to the phenoxide ring. The heteroatom containing group may contain one or more of the same or different heteroatoms. Preferred heteroatom containing groups include imines, amines, oxides, phosphines, ethers, ketones, oxoazolines heterocyclics, oxazolines, thioethers, and the like. Particularly preferred heteroatom containing groups include imines. Any two adjacent R groups may form a ring structure, preferably a 5 or 6 membered ring. Likewise the R groups may form multi-ring structures. In one embodiment any two or more R groups do not form a 5 membered ring.

In a preferred embodiment the heteroatom substituted phenoxide transition metal compound is an iminophenoxide Group 4 transition metal compound, and more preferably an iminophenoxidezirconium compound.

Supported Catalyst Systems

The term "supported" as used herein refers to one or more compounds that are deposited on, contacted with, vaporized with, bonded to, or incorporated within, adsorbed or absorbed in, or on, a support or carrier. The terms "support" or "carrier" for purposes of this specification are used interchangeably and are any support material, preferably a porous support material, including inorganic or organic support materials. Non-limiting examples of inorganic support materials include inorganic oxides and inorganic chlorides. Other carriers include resinous support materials such as polystyrene, functionalized or crosslinked organic supports, such as polystyrene, divinyl benzene, polyolefins, or polymeric compounds, zeolites, talc, clays, or any other organic or inorganic support material and the like, or mixtures thereof.

The support materials utilized may be any of the conventional support materials. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred supports include silica, fumed silica, alumina, silica-alumina and mixtures thereof. Other useful supports include magnesia, titania, zirconia, magnesium chloride, montmorillonite, phyllosilicate, zeolites, talc, clays and the like. Also, combinations of these support materials may be used, for example, silica-chromium, silica-alumina, silica-titania and the like. Additional support materials may include those porous acrylic polymers. Other support materials include nanocomposites, aerogels, spherulites, and polymeric beads. Another support is fumed silica available under the trade name Cabosil™ TS-610, available from Cabot Corporation. Fumed silica is typically a silica with particles 7 to 30 nanometers in size that has been treated with dimethylsilyldichloride such that a majority of the surface hydroxyl groups are capped.

In another embodiment, any of the conventionally known inorganic oxides, such as silica, support materials that retain hydroxyl groups after dehydration treatment methods will be suitable in accordance with the invention. Because of availability, both of silica and silica containing metal oxide based supports, for example, silica-alumina, are preferred. Silica particles, gels and glass beads are most typical.

These metal oxide compositions may additionally contain oxides of other metals, such as those of Al, K, Mg, Na, Si, Ti and Zr and should preferably be treated by thermal and/or chemical means to remove water and free oxygen. Typically such treatment is in a vacuum in a heated oven, in a heated fluidized bed or with dehydrating agents such as organo silanes, siloxanes, alkyl aluminum compounds, etc. The level of treatment should be such that as much retained moisture and oxygen as is possible is removed, but that a chemically significant amount of hydroxyl functionality is retained. Thus calcining at up to 800° C. or more up to a point prior to decomposition of the support material, for several hours is permissible, and if higher loading of supported anionic activator is desired, lower calcining temperatures for lesser times will be suitable. Where the metal oxide is silica, loadings to achieve from less than 0.1 mmol to 3.0 mmol activator/g $SiO_2$ are typically suitable and can be achieved, for example, by varying the temperature of calcining from 200° C. to 1,000° C., such as from 300° C. to 900° C., 400° C. to 875° C., 500° C. to 850° C., 600° C. to 825° C., 700° C. to 800° C., and any combination of any limit with any lower limit.

The tailoring of hydroxyl groups available as attachment sites in this invention can also be accomplished by the pre-treatment with a less than stoichiometric amount of a chemical dehydrating agent. If calcining temperatures below 400° C. are employed, difunctional coupling agents (e.g., $(CH_3)_3SiCl_2$) may be employed to cap hydrogen bonded pairs of silanol groups which are present under the less severe calcining conditions. Similarly, use of the Lewis acid in excess of the stoichiometric amount needed for reaction with the transition metal compounds will serve to neutralize excess silanol groups without significant detrimental effect for catalyst preparation or subsequent polymerization.

In another embodiment, the support is a polymeric support, including hydroxyl-functional-group-containing polymeric substrates, but functional groups may be any of the primary alkyl amines, secondary alkyl amines, and others, where the groups are structurally incorporated in a polymeric chain and capable of a acid-base reaction with the Lewis acid such that a ligand filling one coordination site of the aluminum is protonated and replaced by the polymer incorporated functionality. See, for example, the functional group containing polymers of U.S. Pat. No. 5,288,677.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 $\mu m$. More preferably, the surface area of the support material is in the range of from about 50 to about 500 $m^2/g$, pore volume of from about 0.5 to about 3.5 cc/g and average particle size of from about 10 to about 200 $\mu m$. The average pore size of the carrier is typically in the range of from 10 to 1000 Å, preferably 50 to about 500 Å, and most preferably 75 to about 350 Å.

The support materials may be treated chemically, for example with a fluoride compound as described in WO 00/12565. Other supported activators are described in for example WO 00/13792 that refers to supported boron containing solid acid complex.

In one aspect, the active polymerization catalyst system is formed by contacting a catalyst support with the one or more dialuminoxanes to form a treated catalyst support. The treated catalyst support is then contacted with the one or more halogen substituted aryl boranes to form a supported activator. The supported activator is then contacted with the one or more polymerization catalysts to form the supported polymerization catalyst system.

In one embodiment, the support material having the dialuminoxane compound bonded thereto may be prepared by combining the dialuminoxane with the support material in a suitable solvent. In one embodiment, the combination is carried out at any suitable pressure and temperature under an inert atmosphere. Preferably the combination is at atmospheric pressure, ambient temperature under nitrogen. More preferably, the mixture is heated to less than about 200° C., more preferably less than 150° C. The dialuminoxane is contacted with the support for a suitable amount of time, such as about 1 minute, preferably about 1 minute to about 10 hours, more preferably for about 1 minute to about 3 hours prior to the addition of the one or more halogen substituted aryl boranes.

In another embodiment, an antistatic agent or surface modifier that is used in the preparation of the supported catalyst system as described in PCT publication WO 96/11960 may be used with catalyst systems including the activator compounds described herein. The catalyst systems may also be prepared in the presence of an olefin, for example 1-hexene.

In another embodiment, the activator and/or catalyst system may be combined with a carboxylic acid salt of a metal ester, for example aluminum carboxylates such as aluminum mono, di- and tri-stearates, aluminum octoates, oleates and cyclohexylbutyrates, as described in U.S. Pat. Nos. 6,300,436 and 6,306,984.

Polymerization Process

The activators and the polymerization catalysts described above, whether supported or not, are suitable for use in any prepolymerization and/or polymerization process over a wide range of temperatures and pressures. The temperatures may be in the range of from −60° C. to about 280° C., preferably from 50° C. to about 200° C. In one embodiment, the polymerization temperature is above 0° C., above 50° C., above 80° C., above 100° C., above 150° C., or above 200° C. In one embodiment, the pressures employed may be in the range from 1 atmosphere to about 500 atmospheres or higher.

Polymerization processes include solution, gas phase, slurry phase, and a high pressure process, or a combination thereof. Particularly preferred is a gas phase or slurry phase polymerization of one or more olefin(s) at least one of which is ethylene or propylene.

In one embodiment, the process is a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, 1-butene, 1-pentene, 4-methyl-1-pentene, 1-hexene, 1-octene and 1-decene.

Other monomers useful include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In another embodiment, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms.

Typically in a gas phase polymerization process, a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer.

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to about 110° C., and most preferably in the range of from about 70° C. to about 95° C. In another embodiment, the reactor temperature in a gas phase process is above 60° C.

Other gas phase processes include series or multistage polymerization processes. Gas phase processes may also include those described in U.S. Pat. Nos. 5,627,242, 5,665, 818 and 5,677,375, and European publications EP-A-0 794 200 EP-B1-0 649 992, EP-A-0 802 202 and EP-B-634 421.

In another embodiment, the process may produce greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In another embodiment, the slurry process temperature is above 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In another embodiment, the polymerization technique is referred to as a particle form polymerization, or a slurry process where the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484.

In another embodiment, this process may produce greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor may produce greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555 and PCT WO 99/32525.

In one embodiment, the slurry or gas phase process is operated in the presence of the catalyst system described herein and in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. Nos. 5,712,352 and 5,763,543.

In another embodiment, the method provides for injecting the catalyst system described herein into a reactor, particularly a gas phase reactor. In one embodiment the catalyst system is used in the unsupported form, preferably in a liquid form such as described in U.S. Pat. Nos. 5,317,036 and 5,693,727 and European publication EP-A-0 593 083. The polymerization catalyst in liquid form can be fed with an activator, and/or a support, and/or a supported activator together or separately to a reactor. The injection methods described in PCT publication WO 97/46599 may be utilized.

Where an unsupported catalyst system is used the mole ratio of the metal of the activator component to the metal of the catalyst compound is in the range of between 0.3:1 to 10,000:1, preferably 100:1 to 5000:1, and most preferably 500:1 to 2000:1.

Polymer Products

The polymers produced can be used in a wide variety of products and end-use applications. The polymers produced include polyethylene homopolymers and polyethylene co-polymers, including linear low density polyethylene, elastomers, plastomers, high density polyethylenes, medium density polyethylenes, low density polyethylenes, as well as polypropylene homopolymers and polypropylene co polymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced typically have a molecular weight distribution, a weight average molecular weight to number average molecular weight (Mw/Mn) of greater than 1.5 to about 15, particularly greater than 2 to about 10, more preferably greater than about 2.2 to less than about 8, and most preferably from 2.5 to 8. The polymers may have a narrow molecular weight distribution and a broad composition distribution or vice-versa, and may be those polymers described in U.S. Pat. No. 5,798,427.

Also, the polymers typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993. The polymers in one embodiment have CDBI's generally in the range of greater than 50% to 100%, preferably 99%, preferably in the range of 55% to 85%, and more preferably 60% to 80%, even more preferably greater than 60%, still even more preferably greater than 65%. In another embodiment, polymers produced using a catalyst system described herein have a CDBI less than 50%, more preferably less than 40%, and most preferably less than 30%.

The polymers in one embodiment have a melt index (MI) or ($I_2$) as measured by ASTM-D-1238-E (190/2.16) in the range from no measurable flow to 1000 dg/min, more preferably from about 0.01 dg/min to about 100 dg/min, even more preferably from about 0.1 dg/min to about 50 dg/min, and most preferably from about 0.1 dg/min to about 10 dg/min.

In one embodiment, the polymers have a melt index ratio ($I_{21}/I_2$) ($I_{21}$ is measured by ASTM-D-1238-F) (190/21.6) of from 10 to less than 25, more preferably from about 15 to less than 25. The polymers, in a preferred embodiment, have a melt index ratio ($I_{21}/I_2$) of from greater than 25, more preferably greater than 30, even more preferably greater that 40, still even more preferably greater than 50 and most preferably greater than 65. For example, the melt index ratio ($I_{21}/I_2$) may be of from 5 to 300, 10 to 200, 20 to 180, 30 to 160, 40 to 120, 50 to 100, 60 to 90, and a combination of any upper limit with any lower limit.

In yet another embodiment, propylene based polymers are produced. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117.

The polymers may be blended and/or coextruded with any other polymer. Non-limiting examples of other polymers include linear low density polyethylenes, elastomers, plastomers, high pressure low density polyethylene, high density polyethylenes, polypropylenes and the like.

The polymers produced and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the foregoing discussion, the following non-limiting examples are offered. Although the examples may be directed to specific embodiments of the present invention, they are not to be viewed as limiting the invention in any specific respect. All parts, proportions, and percentages are by weight unless otherwise indicated. All examples were carried out in dry, oxygen-free environments and solvents. All molecular weights are weight average molecular weight unless otherwise noted. Molecular weights (weight average molecular weight ($M_w$) and number average molecular weight ($M_n$) and ($M_z$) were measured by Gel Permeation Chromatography (GPC).

Catalyst Preparation

The catalyst synthesis and preparation is described below. In each of the examples to follow, trisperfluorophenylborane was purchased from Boulder Chemical Co., located in Boulder, Colo., and used as received. Tetraethyldialuminoxane (1.0 molar in toluene) and all solvents were purchased from Aldrich and used as received. Bis(1,3-methyl, n-butyl cyclopentadienyl) zirconium dimethyl ((1,3-MeBuCp)$_2$ZrMe$_2$) solution (20 wt % in toluene) was purchased from Norquay Single-Site Catalysts and used as received. The silica was Grace Davison 948 and calcined to the appropriate temperature described below.

The (—(CH$_2$)$_4$—Si(CpMe$_4$)(Ind)ZrMe$_2$ catalyst was a reaction product of one equivalent of (—(CH$_2$)$_4$—Si(CpMe$_4$)(Ind)ZrCl$_2$ and two equivalents of methyl lithium in diethyl ether. The (—(CH$_2$)$_4$—Si(CpMe$_4$)(Ind)ZrCl$_2$ was synthesized as described in U.S. Pat. No. 6,339,134, and the methyl lithium was purchased from Aldrich and used as received.

Example 1

0.860 grams of tetraethyldialuminoxane was combined with 1.0 grams of silica (Davison 948 calcined at 600° C.) in a 100 mL flask. The resulting slurry was allowed to sit overnight. The resulting silica was filtered, and rinsed with several 10 mL portions of toluene. 0.05 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—(CH$_2$)$_4$—Si(CpMe$_4$)(Ind)ZrMe$_2$. The supported catalyst was allowed to sit at room temperature for 1 hr. The catalyst was filtered, rinsed with several 10 mL portions of toluene, and dried under a vacuum.

Example 2

0.645 grams of tetraethyldialuminoxane was combined with 1.0 grams of silica (Davison 948 calcined at 600° C.)

in a 100 mL flask. The resulting slurry was allowed to sit overnight. The resulting silica was filtered, and rinsed with several 10 mL portions of toluene. 0.05 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—$(CH_2)_4$—Si($CpMe_4$)(Ind)Zr$Me_2$. The supported catalyst was allowed to sit at room temperature for 1 hr. The catalyst was filtered, rinsed with several 10 mL portions of toluene, and dried under a vacuum.

Example 3

0.430 grams of tetraethyldialuminoxane was combined with 1.0 grams of silica (Davison 948 calcined at 600° C.) in a 100 mL flask. The resulting slurry was allowed to sit overnight. The resulting silica was filtered, and rinsed with several 10 mL portions of toluene. 0.05 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—$(CH_2)_4$—Si($CpMe_4$)(Ind)Zr$Me_2$. The supported catalyst was allowed to sit at room temperature for 1 hr. The catalyst was filtered, rinsed with several 10 mL portions of toluene, and dried under a vacuum.

Example 4

0.650 grams of tetraethyldialuminoxane was combined with 1.0 grams of silica (Davison 948 calcined at 600° C.) in a 100 mL flask. The resulting slurry was allowed to sit overnight. The resulting silica was filtered, and rinsed with several 10 mL portions of toluene. 0.075 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—$(CH_2)_4$—Si($CpMe_4$)(Ind)Zr$Me_2$. The supported catalyst was allowed to sit at room temperature for 1 hr. The catalyst was filtered, rinsed with several 10 mL portions of toluene, and dried under a vacuum.

Example 5

0.650 grams of tetraethyldialuminoxane was combined with 1.0 grams of silica (Davison 948 calcined at 600° C.) in a 100 mL flask. The resulting slurry was allowed to sit overnight. The resulting silica was filtered, and rinsed with several 10 mL portions of toluene. 0.10 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—$(CH_2)_4$—Si($CpMe_4$)(Ind)Zr$Me_2$. The supported catalyst was allowed to sit at room temperature for 1 hr. The catalyst was filtered, rinsed with several 10 mL portions of toluene, and dried under a vacuum.

Example 6

0.650 grams of tetraethyldialuminoxane was combined with 1.0 grams of silica (Davison 948 calcined at 600° C.) in a 100 mL flask. The resulting slurry was allowed to sit overnight. The resulting silica was filtered, and rinsed with several 10 mL portions of toluene. 0.15 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—$(CH_2)_4$—Si($CpMe_4$)(Ind)Zr$Me_2$. The supported catalyst was allowed to sit at room temperature for 1 hr. The catalyst was filtered, rinsed with several 10 mL portions of toluene, and dried under a vacuum.

Example 7

1.07 grams of tetraethyldialuminoxane was combined with 1.0 grams of silica (Davison 948 calcined at 400° C.) in a 100 mL flask. The resulting slurry was allowed to sit overnight. The resulting silica was filtered, and rinsed with several 10 mL portions of toluene. 0.10 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—$(CH_2)_4$—Si($CpMe_4$)(Ind)Zr$Me_2$. The supported catalyst was allowed to sit at room temperature for 1 hr. The catalyst was filtered, rinsed with several 10 mL portions of toluene, and dried under a vacuum.

Example 8

0.860 grams of tetraethyldialuminoxane was combined with 1.0 grams of silica (Davison 948 calcined at 400° C.) in a 100 mL flask. The resulting slurry was allowed to sit overnight. The resulting silica was filtered, and rinsed with several 10 mL portions of toluene. 0.10 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—$(CH_2)_4$—Si($CpMe_4$)(Ind)Zr$Me_2$. The supported catalyst was allowed to sit at room temperature for 1 hr. The catalyst was filtered, rinsed with several 10 mL portions of toluene, and dried under a vacuum.

Example 9

0.645 grams of tetraethyldialuminoxane was combined with 1.0 grams of silica (Davison 948 calcined at 400° C.) in a 100 mL flask. The resulting slurry was allowed to sit overnight. The resulting silica was filtered, and rinsed with several 10 mL portions of toluene. 0.10 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—$(CH_2)_4$—Si($CpMe_4$)(Ind)Zr$Me_2$. The supported catalyst was allowed to sit at room temperature for 1 hr. The catalyst was filtered, rinsed with several 10 mL portions of toluene, and dried under a vacuum.

Example 10

0.860 grams of tetraethyldialuminoxane was combined with 1.0 grams of silica (Davison 948 calcined at 400° C.) in a 100 mL flask. The resulting slurry was allowed to sit overnight. The resulting silica was filtered, and rinsed with several 10 mL portions of toluene. 0.125 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—$(CH_2)_4$—Si($CpMe_4$)(Ind)Zr$Me_2$. The supported catalyst was allowed to sit at room temperature for 1 hr. The catalyst was filtered, rinsed with several 10 mL portions of toluene, and dried under a vacuum.

Example 11

0.860 grams of tetraethyldialuminoxane was combined with 1.0 grams of silica (Davison 948 calcined at 400° C.) in a 100 mL flask. The resulting slurry was allowed to sit overnight. The resulting silica was filtered, and rinsed with several 10 mL portions of toluene. 0.15 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—(CH$_2$)$_4$—Si(CpMe$_4$)(Ind)ZrMe$_2$. The supported catalyst was allowed to sit at room temperature for 1 hr. The catalyst was filtered, rinsed with several 10 mL portions of toluene, and dried under a vacuum.

Example 12

0.860 grams of tetraethyldialuminoxane was combined with 1.0 grams of silica (Davison 948 calcined at 400° C.) in a 100 mL flask. The resulting slurry was allowed to sit overnight. The resulting silica was filtered, and rinsed with several 10 mL portions of toluene. 0.20 grams of trisperfluorophenylborane was added to the dialuminoxane treated silica, slurried in toluene and heated to 100° C. for three hours. The silica was then filtered, rinsed with several 10 mL portions of toluene, and subsequently combined with 0.025 grams of (—(CH$_2$)$_4$—Si(CpMe$_4$)(Ind)ZrMe$_2$. The supported catalyst was allowed to sit at room temperature for 1 hr. The catalyst was filtered, rinsed with several 10 mL portions of toluene, and dried under a vacuum.

Example 13

In a 100 mL round bottom flask, 860 mg of tetraethylaluminoxane was dissolved in 30 mL of toluene. To this solution, 1.00 g. of silica (Davison 948 calcined at 400° C.) was added. This slurry was allowed to stand overnight at room temperature. The slurry was filtered through a frit, washed with toluene (3×10 mL) and partially dried under vacuum. In a dry 100 mL round bottom flask, 200 mg of trisperfluorophenylborane was dissolved in 30 mL of toluene. The partially dried silica was transferred to the flask and slurried. The flask was placed in an oil bath at 100° C. for three hours and stirred every half-hour. The flask was removed from the oil bath and allowed to cool to room temperature. The slurry was then filtered, washed with toluene, and partially dried under vacuum. In a dry 100 mL round bottom flask, 100 mg of (1,3-MeBuCp)$_2$ZrMe$_2$ solution was dissolved in 30 mL of toluene. The partially dried activator treated silica was transferred into the flask and the slurry was allowed to stand overnight at room temperature. The slurry was filtered through a frit and dried thoroughly under vacuum.

Example 14

In a 100 mL round bottom flask, 860 mg of tetraethylaluminoxane was dissolved in 30 mL of toluene. To this solution, 1.00 g. of silica (Davison 948 calcined at 300° C.) was added. This slurry was allowed to stand overnight at room temperature. The slurry was filtered through a frit, washed with toluene (3×10 mL) and partially dried under vacuum. In a dry 100 mL round bottom flask, 100 mg of trisperfluorophenylborane was dissolved in 30 mL of toluene. The partially dried silica was transferred to the flask and slurried. The flask was placed in an oil bath at 100° C. for three hours and stirred every half-hour. The flask was removed from the oil bath and allowed to cool to room temperature. The slurry was then filtered, washed with toluene, and partially dried under vacuum. In a dry 100 mL round bottom flask, 100 mg of (1,3-MeBuCp)$_2$ZrMe$_2$ solution was dissolved in 30 mL of toluene. The partially dried silica was transferred into the flask and the slurry was allowed to stand overnight at room temperature. The slurry was filtered through a frit and dried thoroughly under vacuum.

Example 15

In a 100 mL round bottom flask, 930 mg of tetraethylaluminoxane was dissolved in 30 mL of toluene. To this solution, 1.00 g. of silica (Davison 948 calcined at 300° C.) was added. This slurry was allowed to stand overnight at room temperature. The slurry was filtered through a frit, washed with toluene (3×10 mL) and partially dried under vacuum. In a dry 100 mL round bottom flask, 200 mg of trisperfluorophenylborane was dissolved in 30 mL of toluene. The partially dried silica was transferred to the flask and slurried. The flask was placed in an oil bath at 100° C. for three hours and stirred every half-hour. The flask was removed from the oil bath and allowed to cool to room temperature. The slurry was then filtered, washed with toluene and partially dried under vacuum. In a dry 100 mL round bottom flask, 100 mg of (1,3-MeBuCp)$_2$ZrMe$_2$ solution was dissolved in 30 mL of toluene. The partially dried silica was transferred into the flask and the slurry was allowed to stand overnight at room temperature. The slurry was filtered through a frit and dried thoroughly under vacuum.

Example 16

In a 100 mL round bottom flask, 1.00 g of tetraethylaluminoxane was dissolved in 30 mL of toluene. To this solution, 1.00 g. of silica (Davison 948 calcined at 300° C.) was added. This slurry was allowed to stand overnight at room temperature. The slurry was filtered through a frit, washed with toluene (3×10 mL) and partially dried under vacuum. In a dry 100 mL round bottom flask, 250 mg of trisperfluorophenylborane was dissolved in 30 mL of toluene. The partially dried silica was transferred to the flask and slurried. The flask was placed in an oil bath at 100° C. for three hours and stirred every half-hour. The flask was removed from the oil bath and allowed to cool to room temperature. The slurry was then filtered, washed with toluene and partially dried under vacuum. In a dry 100 mL round bottom flask, 100 mg of (1,3-MeBuCp)$_2$ZrMe$_2$ solution was dissolved in 30 mL of toluene. The partially dried silica was transferred into the flask and the slurry was allowed to stand overnight at room temperature. The slurry was filtered through a frit and dried thoroughly under vacuum.

Example 17

In a 100 mL round bottom flask, 1.00 g of tetraethylaluminoxane was dissolved in 30 mL of toluene. To this solution, 1.00 g. of silica (Davison 948 calcined at 200° C.) was added. This slurry was allowed to stand overnight at room temperature. The slurry was filtered through a frit, washed with toluene (3×10 mL) and partially dried under vacuum. In a dry 100 mL round bottom flask, 100 mg of trisperfluorophenylborane was dissolved in 30 mL of toluene. The partially dried silica was transferred to the flask and slurried. The flask was placed in an oil bath at 100° C. for three hours and stirred every half-hour. The flask was removed from the oil bath and allowed to cool to room temperature. The slurry was then filtered, washed with toluene and partially dried under vacuum. In a dry 100 mL round bottom flask, 100 mg of (1,3-MeBuCp)$_2$ZrMe$_2$ solution was dissolved in 30 mL of toluene. The partially dried silica was transferred into the flask and the slurry was allowed to stand overnight at room temperature. The slurry was filtered through a frit and dried thoroughly under vacuum.

Example 18

In a 100 mL round bottom flask, 1.00 g of tetraethyldialuminoxane was dissolved in 30 mL of toluene. To this solution, 1.00 g. of silica (Davison 948 calcined at 200° C.) was added. This slurry was allowed to stand overnight at room temperature. The slurry was filtered through a frit, washed with toluene (3×10 mL) and partially dried under vacuum. In a dry 100 mL round bottom flask, 200 mg of trisperfluorophenylborane was dissolved in 30 mL of toluene. The partially dried silica was transferred to the flask and slurried. The flask was placed in an oil bath at 100° C. for three hours and stirred every half-hour. The flask was removed from the oil bath and allowed to cool to room temperature. The slurry was then filtered, washed with toluene and partially dried under vacuum. In a dry 100 mL round bottom flask, 100 mg of (1,3-MeBuCp)$_2$ZrMe$_2$ solution was dissolved in 30 mL of toluene. The partially dried silica was transferred into the flask and the slurry was allowed to stand overnight at room temperature. The slurry was filtered through a frit and dried thoroughly under vacuum.

Example 19

In a 100 mL round bottom flask, 1.00 g of tetraethyldialuminoxane was dissolved in 30 mL of toluene. To this solution, 1.00 g. of silica (Davison 948 calcined at 200° C.) was added. This slurry was allowed to stand overnight at room temperature. The slurry was filtered through a frit, washed with toluene (3×10 mL) and partially dried under vacuum. In a dry 100 mL round bottom flask, 250 mg of trisperfluorophenylborane was dissolved in 30 mL of toluene. The partially dried silica was transferred to the flask and slurried. The flask was placed in an oil bath at 100° C. for three hours and stirred every half-hour. The flask was removed from the oil bath and allowed to cool to room temperature. The slurry was then filtered, washed with toluene and partially dried under vacuum. In a dry 100 mL round bottom flask, 100 mg of (1,3-MeBuCp)$_2$ZrMe$_2$ solution was dissolved in 30 mL of toluene. The partially dried silica was transferred into the flask and the slurry was allowed to stand overnight at room temperature. The slurry was filtered through a frit and dried thoroughly under vacuum.

Example 20

1.0 grams of tetraethyldialuminoxane in toluene was combined with 1.0 grams of silica (Davison 948 calcined at 300° C.) in a 100 flask. The resulting slurry was allowed to sit overnight. The resulting silica was filtered, and rinsed with several 10 mL portions of toluene. 0.10 grams of trisperfluorophenylborane was added to silica, slurried in o-xylene and heated to 130° C. for three hours. The silica was then filtered, rinsed with several 10 mL portions of toluene, and subsequently combined with 0.09 grams of (1,3-MeBuCp)$_2$ZrMe$_2$ solution. The supported catalyst was allowed to sit at room temperature for 1 hr. The catalyst was then filtered, rinsed with several 10 mL portions of toluene, and dried under a vacuum.

Example 21

1.0 grams of tetraethyldialuminoxane in toluene was combined with 1.0 grams of silica (Davison 948 calcined at 300° C.) in a 100 mL flask. The resulting slurry was allowed to sit overnight. The resulting silica was filtered, and rinsed with several 10 mL portions of toluene. 0.20 grams of trisperfluorophenylborane was added to silica, slurried in o-xylene and heated to 130° C. for three hours. The silica was then filtered, rinsed with several 10 mL portions of toluene, and subsequently combined with 0.09 grams of (1,3-MeBuCp)$_2$ZrMe$_2$ solution. The supported catalyst was allowed to sit at room temperature for 1 hr. The catalyst was then filtered, rinsed with several 10 mL portions of toluene, and dried under a vacuum.

Example 22

0.860 grams of tetraethyldialuminoxane in toluene was combined with 1.0 grams of silica (Davison 948 calcined at 600° C.) in a 100 mL flask. The resulting slurry was allowed to sit overnight. The resulting silica was filtered, and rinsed with several 10 mL portions of toluene. 0.10 grams of trisperfluorophenylborane was added to silica, slurried in o-xylene and heated to 130° C. for three hours. The silica was then filtered, rinsed with several 10 mL portions of toluene, and subsequently combined with 0.09 grams of (1,3-MeBuCp)$_2$ZrMe$_2$ solution. The supported catalyst was allowed to sit at room temperature for 1 hr. The catalyst was then filtered, rinsed with several 10 mL portions of toluene, and dried under a vacuum.

Example 23

0.860 grams of tetraethyldialuminoxane in toluene was combined with 1.0 grams of silica (Davison 948 calcined at 200° C.) in a 100 mL flask. The resulting slurry was allowed to sit overnight. The resulting silica was filtered, and rinsed with several 10 mL portions of toluene. 0.25 grams of trisperfluorophenylborane was added to silica, slurried in o-xylene and heated to 130° C. for three hours. The silica was then filtered, rinsed with several 10 mL portions of toluene, and subsequently combined with 0.09 grams of (1,3-MeBuCp)$_2$ZrMe$_2$ solution. The supported catalyst was allowed to sit at room temperature for 1 hr. The catalyst was then filtered, rinsed with several 10 mL portions of toluene, and dried under a vacuum.

Example 24

1.41 grams of tetraethyldialuminoxane in toluene was combined with 1.0 grams of silica (Davison 948 calcined at 200° C.) in a 100 mL flask. The resulting slurry was allowed to sit overnight. The resulting silica was filtered, and rinsed with several 10 mL portions of toluene. 0.20 grams of trisperfluorophenylborane was added to silica, slurried in o-xylene and heated to 130° C. for three hours. The silica was then filtered, rinsed with several 10 mL portions of toluene, and subsequently combined with 0.09 grams of (1,3-MeBuCp)$_2$ZrMe$_2$ solution. The supported catalyst was allowed to sit at room temperature for 1 hr. The catalyst was then filtered, rinsed with several 10 mL portions of toluene, and dried under a vacuum.

Example 25

2.0 grams of tetraethyldialuminoxane in toluene was combined with 1.0 grams of silica (Davison 948 calcined at 200° C.) in a 100 mL flask. The resulting slurry was allowed to sit overnight. The resulting silica was filtered, and rinsed with several 10 mL portions of toluene. 0.1 grams of trisperfluorophenylborane was added to silica, slurried in o-xylene and heated to 130° C. for three hours. The silica was then filtered, rinsed with several 10 mL portions of toluene, and subsequently combined with 0.09 grams of (1,3-MeBuCp)$_2$ZrMe$_2$ solution. The supported catalyst was allowed to sit at room temperature for 1 hr. The catalyst was then filtered, rinsed with several 10 mL portions of toluene, and dried under a vacuum.

Example 26

0.702 grams of tetraethyldialuminoxane in toluene was combined with 1.0 grams of silica (Davison 948 calcined at 200° C.) in a 100 mL flask. The resulting slurry was allowed to sit overnight. The resulting silica was filtered, and rinsed with several 10 mL portions of toluene. 0.1 grams of trisperfluorophenylborane was added to silica, slurried in o-xylene and heated to 140° C. for three hours. The silica was then filtered, rinsed with several 10 mL portions of toluene, and subsequently combined with 0.09 grams of (1,3-MeBuCp)$_2$ZrMe$_2$ solution. The supported catalyst was allowed to sit at room temperature for 1 hr. The catalyst was then filtered, rinsed with several 10 mL portions of toluene, and dried under a vacuum.

Example 27

27.52 grams of tetraethyldialuminoxane in toluene was combined with 40.0 grams of silica (Davison 948 calcined at 200° C.) in a 100 mL flask. The slurry was allowed to sit overnight. The resulting silica was filtered, and rinsed with several 50 mL portions of toluene. 4.0 grams of trisperfluorophenylborane was added to silica, slurried in o-xylene and heated to 140° C. for one hour. The temperature was reduced to 110° C., and the slurry was further heated for two hours. The silica was then filtered, rinsed with several 50 mL portions of toluene. The "activated" silica was then dried under vacuum. 34.6 grams of the product was combined with 2.63 grams of (1,3-MeBuCp)$_2$ZrMe$_2$ solution. The supported catalyst was allowed to sit at room temperature for 1 hr. The catalyst was then filtered, rinsed with several 50 mL portions of toluene, and dried under a vacuum.

Polymerizations:

Polymerizations were performed in a glass-lined 20 mL autoclave reactor equipped with a mechanical stirrer, an external heater for temperature control, a septum inlet and a regulated supply of dry nitrogen and ethylene in an inert atmosphere (nitrogen) glove box. The reactor was dried and degassed thoroughly at 115° C. At room temperature and atmospheric pressure the reactor was charged with approximately 3,000 mg hexane, 17.0 mg hexene, and 1.5 mg tri-n-octylaluminum. The reactor was then charged with ethylene while stirring at 800 RPM and brought to a process pressure of 130 psig (896 kPa) and process temperature of 85° C. The supported catalyst was slurried and added via syringe with the reactor. The polymerization was continued while maintaining the reaction vessel within 3° C. of the target process temperature (85° C.) and within 5 psig (34 kPa) of the target process pressure (130 psig or 896 kPa). The typical reaction time was about 40 minutes. After about 40 minutes, the reaction was stopped by pressurizing the reactor to 30 psig (207 kPa) above the target process pressure with a gas mixture composed of 5 mol % oxygen in argon. The polymer was recovered by vacuum centrifugation of the reaction mixture. Bulk polymerization activity was calculated by dividing the yield of polymer by the total weight of the catalyst charge by the time in hours.

Polymerization results are shown below in Tables 1–3. Table 1 summarizes the results for Examples 1–12. Table 2 summarizes the results for Examples 13–19. Table 3 summarizes the results for Examples 20–27.

TABLE 1

Polymerizations via (—(CH$_2$)$_4$—Si(CpMe$_4$)(Ind)ZrMe$_2$

| | Comonomer Incorporation | Average Mw | Average Mn | Average PDI | Yield | Activity (gP/gCat*hr) |
|---|---|---|---|---|---|---|
| EX. 1 | | | | | | |
| 1 | 2.40 | 223766 | 92186 | 2.40 | 0.018 | 53.3 |
| 2 | 2.30 | 229367 | 110477 | 2.10 | 0.020 | 59.2 |
| 3 | 2.50 | 231717 | 113054 | 2.00 | 0.023 | 68.1 |
| 4 | 2.50 | 230625 | 110852 | 2.10 | 0.023 | 68.1 |
| 5 | 2.40 | 225705 | 91848 | 2.50 | 0.023 | 68.1 |
| 6 | 2.50 | 231697 | 101952 | 2.30 | 0.017 | 50.4 |
| average | 2.43 | 228813 | 103395 | 2.23 | 0.021 | 61.2 |
| EX. 2 | | | | | | |
| 1 | 2.50 | 216081 | 102124 | 2.10 | 0.026 | 77.0 |
| 2 | 2.50 | 230372 | 109867 | 2.10 | 0.042 | 124.2 |
| 3 | 2.40 | 226393 | 90520 | 2.50 | 0.035 | 103.7 |
| 4 | 2.50 | 231879 | 111562 | 2.10 | 0.029 | 85.9 |
| 5 | 2.50 | 261782 | 75606 | 3.50 | 0.037 | 109.6 |
| 6 | 2.40 | 234310 | 101197 | 2.30 | 0.030 | 88.9 |
| average | 2.47 | 233470 | 98479 | 2.43 | 0.033 | 98.3 |
| EX. 3 | | | | | | |
| 1 | — | — | — | — | 0.004 | 11.8 |
| 2 | — | — | — | — | 0.004 | 11.8 |
| 3 | — | — | — | — | 0.005 | 14.8 |
| 4 | — | — | — | — | 0.004 | 11.8 |
| 5 | — | — | — | — | 0.005 | 14.8 |
| 6 | — | — | — | — | 0.005 | 14.8 |
| average | — | — | — | — | 0.005 | 13.3 |
| EX. 4 | | | | | | |
| 1 | 2.40 | 225368 | 110639 | 2.00 | 0.097 | 287.3 |
| 2 | 2.60 | 230385 | 85842 | 2.70 | 0.090 | 266.5 |
| 3 | 2.50 | 225504 | 85413 | 2.60 | 0.084 | 248.7 |
| 4 | 2.50 | 236960 | 113359 | 2.10 | 0.082 | 242.8 |
| 5 | 2.50 | 225313 | 104276 | 2.20 | 0.091 | 269.5 |
| 6 | 2.50 | 228706 | 99906 | 2.32 | 0.089 | 263.0 |
| average | 2.40 | 225368 | 110639 | 2.00 | 0.097 | 287.3 |
| EX. 5 | | | | | | |
| 1 | 4.80 | 208283 | 78766 | 2.60 | 0.115 | 340.7 |
| 2 | 2.70 | 233334 | 108107 | 2.20 | 0.081 | 383.4 |
| 3 | 2.70 | 222881 | 106346 | 2.10 | 0.097 | 366.9 |
| 4 | 2.80 | 218560 | 69140 | 3.20 | 0.101 | 299.1 |
| 5 | 2.50 | 225332 | 109794 | 2.10 | 0.130 | 385.0 |
| 6 | 2.50 | 222868 | 103050 | 2.20 | 0.113 | 382.1 |
| average | 3.00 | 221876 | 95867 | 2.40 | 0.106 | 359.5 |
| EX. 6 | | | | | | |
| 1 | 2.50 | 246777 | 97622 | 2.50 | 0.064 | 189.6 |
| 2 | 2.80 | 235464 | 104411 | 2.30 | 0.060 | 177.7 |
| 3 | 3.00 | 239388 | 103743 | 2.30 | 0.056 | 165.9 |
| 4 | 2.50 | 235636 | 95988 | 2.50 | 0.058 | 171.8 |
| 5 | 2.60 | 237700 | 103687 | 2.30 | 0.069 | 204.6 |
| 6 | 2.90 | 239778 | 95033 | 2.50 | 0.072 | 213.3 |
| average | 2.72 | 239124 | 100081 | 2.40 | 0.063 | 187.2 |
| EX. 7 | | | | | | |
| 1 | 2.50 | — | — | — | 0.089 | 263.7 |
| 2 | 2.60 | — | — | — | 0.099 | 293.2 |
| 3 | 2.50 | — | — | — | 0.099 | 293.3 |
| 4 | 2.70 | — | — | — | 0.094 | 278.4 |
| 5 | 2.90 | — | — | — | 0.092 | 272.5 |
| 6 | 2.70 | — | — | — | 0.086 | 254.8 |
| average | 2.65 | — | — | — | 0.093 | 276.0 |
| EX. 8 | | | | | | |
| 1 | 3.10 | — | — | — | 0.116 | 360.8 |
| 2 | 2.90 | — | — | — | 0.120 | 372.4 |
| 3 | 2.60 | — | — | — | 0.115 | 413.1 |

TABLE 1-continued

Polymerizations via (—(CH$_2$)$_4$—Si(CpMe$_4$)(Ind)ZrMe$_2$.

| | Comonomer Incorporation | Average Mw | Average Mn | Average PDI | Yield | Activity (gP/gCat*hr) |
|---|---|---|---|---|---|---|
| 4 | 3.30 | — | — | — | 0.108 | 319.9 |
| 5 | 3.30 | — | — | — | 0.120 | 434.2 |
| 6 | 3.00 | — | — | — | 0.115 | 416.3 |
| average | 3.03 | — | — | — | 0.116 | 386.1 |
| EX. 9 | | | | | | |
| 1 | 3.50 | — | — | — | 0.093 | 275.5 |
| 2 | 2.70 | — | — | — | 0.107 | 317.0 |
| 3 | 3.10 | — | — | — | 0.094 | 278.5 |
| 4 | 3.20 | — | — | — | 0.105 | 321.3 |
| 5 | 3.00 | — | — | — | 0.108 | 319.9 |
| average | 3.10 | — | — | — | 0.101 | 302.4 |
| EX. 10 | | | | | | |
| 1 | 3.70 | — | — | — | 0.124 | 771.2 |
| 2 | 3.50 | — | — | — | 0.122 | 819.4 |
| 3 | 3.30 | — | — | — | 0.119 | 765.3 |
| 4 | 3.60 | — | — | — | 0.120 | 674.4 |
| 5 | 3.30 | — | — | — | 0.121 | 785.1 |
| 6 | 3.30 | — | — | — | 0.109 | 829.8 |
| average | 3.45 | — | — | — | 0.119 | 774.2 |
| EX. 11 | | | | | | |
| 1 | 3.10 | — | — | — | 0.117 | 373.0 |
| 2 | 3.20 | — | — | — | 0.119 | 470.9 |
| 3 | 3.10 | — | — | — | 0.101 | 511.4 |
| 4 | 3.50 | — | — | — | 0.121 | 358.4 |
| 5 | 3.00 | — | — | — | 0.109 | 546.0 |
| 6 | 2.60 | — | — | — | 0.113 | 355.4 |
| average | 3.08 | — | — | — | 0.113 | 435.9 |
| EX. 12 | | | | | | |
| 1 | 3.40 | — | — | — | 0.126 | 1033.2 |
| 2 | 4.10 | — | — | — | 0.125 | 958.0 |
| 3 | 3.80 | — | — | — | 0.122 | 1059.7 |
| 4 | 4.00 | — | — | — | 0.128 | 1337.2 |
| 5 | 3.50 | — | — | — | 0.122 | 1417.4 |
| 6 | 3.90 | — | — | — | 0.125 | 1302.8 |
| average | 3.78 | — | — | — | 0.125 | 1184.7 |

TABLE 2

Polymerizations via (1,3-MeBuCp)$_2$ZrMe$_2$.

| Catalyst | | Comonomer Incorporation | Average Mw | Average Mn | Average PDI | Yield | Activity (gP/gCat*hr) |
|---|---|---|---|---|---|---|---|
| Ex. 13 | 1 | 3.00 | 416906 | 245276 | 1.70 | 0.112 | 331.7 |
| | 2 | 2.90 | 407630 | 238691 | 1.70 | 0.107 | 316.9 |
| | 3 | 2.90 | 408000 | 240761 | 1.70 | 0.101 | 299.2 |
| | 4 | 3.00 | 403895 | 226295 | 1.80 | 0.087 | 257.7 |
| | 5 | 2.90 | 414917 | 241575 | 1.70 | 0.092 | 272.6 |
| | 6 | 2.90 | 432281 | 211815 | 2.00 | 0.094 | 278.4 |
| | average | 2.93 | 417031 | 226562 | 1.83 | 0.091 | 269.6 |
| EX. 14 | 1 | 2.50 | 489945 | 241860 | 2.00 | 0.062 | 183.6 |
| | 2 | 2.60 | 502925 | 241499 | 2.10 | 0.064 | 189.6 |
| | 3 | 2.60 | 496060 | 269711 | 1.80 | 0.061 | 180.7 |
| | 4 | 2.70 | 473705 | 224551 | 2.10 | 0.079 | 234.0 |
| | 5 | 2.70 | 456552 | 244240 | 1.90 | 0.093 | 275.4 |
| | 6 | 2.80 | 482871 | 253670 | 1.90 | 0.077 | 228.1 |
| | average | 2.73 | 471043 | 240821 | 1.97 | 0.083 | 245.9 |
| EX. 15 | 1 | 2.80 | 452569 | 244160 | 1.90 | 0.098 | 290.3 |
| | 2 | 2.70 | 470026 | 233528 | 2.00 | 0.111 | 328.7 |
| | 3 | 2.90 | 461691 | 227846 | 2.00 | 0.101 | 299.2 |
| | 4 | 2.70 | 442421 | 211317 | 2.10 | 0.093 | 275.5 |
| | 5 | 3.00 | 449904 | 230686 | 2.00 | 0.105 | 311.0 |
| | 6 | 3.10 | 457789 | 252254 | 1.80 | 0.099 | 298.1 |
| | average | 2.93 | 450038 | 231419 | 1.97 | 0.099 | 294.9 |

TABLE 2-continued

Polymerizations via (1,3-MeBuCp)$_2$ZrMe$_2$.

| Catalyst | | Comonomer Incorporation | Average Mw | Average Mn | Average PDI | Yield | Activity (gP/gCat*hr) |
|---|---|---|---|---|---|---|---|
| EX. 16 | 1 | 2.90 | 460248 | 217842 | 2.10 | 0.097 | 287.3 |
| | 2 | 2.80 | 460812 | 247874 | 1.90 | 0.110 | 352.7 |
| | 3 | 2.80 | 453680 | 237861 | 1.90 | 0.102 | 302.1 |
| | 4 | 2.90 | 447407 | 233535 | 1.90 | 0.104 | 308.1 |
| | 5 | 3.00 | 468014 | 259031 | 1.80 | 0.113 | 417.1 |
| | average | 2.88 | 458032 | 239229 | 1.92 | 0.105 | 333.4 |
| EX. 17 | 1 | 2.70 | 476055 | 280096 | 1.70 | 0.086 | 254.8 |
| | 2 | 2.60 | 489163 | 288647 | 1.70 | 0.084 | 248.8 |
| | 3 | 2.60 | 490692 | 283332 | 1.70 | 0.079 | 234.0 |
| | 4 | 3.10 | 461382 | 278104 | 1.70 | 0.098 | 290.3 |
| | 5 | 2.50 | 459607 | 271872 | 1.70 | 0.114 | 337.6 |
| | 6 | 2.60 | 483193 | 290525 | 1.70 | 0.107 | 317.0 |
| | average | 2.68 | 476682 | 282096 | 1.70 | 0.095 | 280.4 |
| EX. 18 | 1 | 2.90 | 415629 | 254208 | 1.60 | 0.119 | 435.4 |
| | 2 | 2.80 | 431331 | 248591 | 1.70 | 0.118 | 471.9 |
| | 3 | 3.10 | 400328 | 243161 | 1.60 | 0.124 | 544.4 |
| | 4 | 2.90 | 416159 | 255835 | 1.60 | 0.123 | 553.6 |
| | 5 | 2.80 | 428613 | 255333 | 1.70 | 0.119 | 591.3 |
| | average | 2.90 | 418412 | 251426 | 1.64 | 0.121 | 519.3 |
| EX. 19 | 1 | 2.70 | 399052 | 244978 | 1.60 | 0.124 | 539.4 |
| | 2 | 3.00 | 415499 | 255272 | 1.60 | 0.124 | 597.7 |
| | 3 | 2.60 | 361000 | 216399 | 1.70 | 0.122 | 595.4 |
| | 4 | 2.70 | 351678 | 208427 | 1.70 | 0.121 | 562.9 |
| | 5 | 2.90 | 344540 | 202559 | 1.70 | 0.124 | 705.7 |
| | average | 2.78 | 374354 | 225527 | 1.66 | 0.123 | 600.2 |

TABLE 3

Polymerizations via (1,3-Me,BuCp)$_2$ZrMe$_2$.

| Catalyst | | Comonomer Incorporation | Average Mw | Average Mn | Average PDI | Yield | Activity (gP/gCat*hr) |
|---|---|---|---|---|---|---|---|
| EX. 20 | 1 | 3.10 | 484463 | 247100 | 2.00 | 0.056 | 165.9 |
| | 2 | 3.00 | 499393 | 222881 | 2.20 | 0.064 | 189.5 |
| | 3 | 3.10 | 508096 | 278238 | 1.80 | 0.069 | 204.4 |
| | average | 3.07 | 497317 | 249406 | 2.00 | 0.063 | 186.6 |
| EX. 21 | 1 | 3.20 | 402144 | 204908 | 2.00 | 0.115 | 385.7 |
| | 2 | 3.30 | 400140 | 216173 | 1.90 | 0.125 | 458.7 |
| | 3 | 3.80 | 467563 | 245489 | 1.90 | 0.112 | 406.8 |
| | average | 3.43 | 423282 | 222190 | 1.93 | 0.117 | 417.1 |
| EX. 22 | 1 | — | — | — | — | 0.013 | 38.5 |
| | 2 | — | — | — | — | 0.014 | 41.5 |
| | 3 | 4.90 | 581327 | 278868 | 2.10 | 0.015 | 44.4 |
| | average | 4.90 | 581327 | 278868 | 2.10 | 0.014 | 41.5 |
| EX. 23 | 1 | 3.10 | 424009 | 71408 | 5.90 | 0.126 | 714.4 |
| | 2 | 3.10 | 425483 | 185344 | 2.30 | 0.126 | 678.3 |
| | 3 | 3.30 | 442826 | 249234 | 1.80 | 0.122 | 654.0 |
| | average | 3.17 | 430773 | 168662 | 3.33 | 0.125 | 682.2 |
| EX. 24 | 1 | 350 | 409086 | 229829 | 1.80 | 0.126 | 854.6 |
| | 2 | 3.30 | 423076 | 241300 | 1.80 | 0.130 | 1041.7 |
| | 3 | 4.40 | 433486 | 175740 | 2.50 | 0.034 | 256.5 |
| | average | 3.73 | 421883 | 215623 | 2.03 | 0.097 | 717.6 |
| EX. 25 | 1 | 3.10 | 412221 | 115877 | 3.60 | 0.120 | 355.5 |
| | 2 | 2.90 | 478218 | 265081 | 1.80 | 0.110 | 404.9 |
| | 3 | 3.00 | 494092 | 249776 | 2.00 | 0.121 | 365.9 |
| | average | 3.00 | 461510 | 210245 | 2.47 | 0.117 | 375.4 |
| EX. 26 | 1 | 3.10 | 455400 | 249740 | 1.80 | 0.115 | 452.0 |
| | 2 | 3.00 | 462092 | 249919 | 1.80 | 0.118 | 587.2 |
| | 3 | 2.90 | 452498 | 223762 | 2.00 | 0.107 | 513.9 |
| | average | 3.00 | 456663 | 241140 | 1.87 | 0.113 | 517.7 |
| EX. 27 | 1 | 3.10 | 387341 | 207282 | 1.90 | 0.126 | 965.5 |
| | 2 | 3.00 | 378827 | 208824 | 1.80 | 0.130 | 1048.3 |
| | 3 | 2.80 | 395727 | 215035 | 1.80 | 0.134 | 1223.5 |
| | average | 2.97 | 387299 | 210380 | 1.83 | 0.130 | 1079.1 |

Comparative Example 1

Silica supported (1,3-MeBuCp)$_2$ZrCl$_2$, activated with MAO, was prepared in accordance with the method outlined in the examples of U.S. Pat. No. 5,712,352. The polymerization results are shown below in Table 4.

TABLE 4

|  |  | Comonomer Incorporation | Average Mw | Average Mn | Average PDI | Yield | Activity (gP/gCat*hr) |
|---|---|---|---|---|---|---|---|
| Comp. EX. 1 | 1 | 2.30 | 331144 | 180960 | 1.80 | 0.128 | 660.4 |
|  | 2 | 2.90 | 346637 | 135216 | 2.60 | 0.103 | 574.0 |
|  | 3 | 2.50 | 337057 | 182777 | 1.80 | 0.129 | 646.0 |
|  | 4 | 2.30 | 330231 | 151962 | 2.20 | 0.121 | 613.2 |
|  | 5 | 2.30 | 321915 | 186250 | 1.70 | 0.122 | 681.2 |
|  | 6 | 2.40 | 339836 | 191126 | 1.80 | 0.128 | 780.3 |
|  | average | 2.45 | 334470 | 171382 | 1.98 | 0.122 | 659.2 |

Comparative Example 2

4.0 grams of a 10 wt % solution of ethylaluminoxane in heptane was combined with 1.0 grams of silica (Davison 948 calcined at 600° C.) in a 100 mL flask. The resulting slurry was allowed to sit overnight. The resulting silica was filtered, and rinsed with several 10 mL portions of toluene. 0.20 grams of trisperfluorophenylborane was added to the silica, slurried in o-xylene and heated to 130° C. for three hours. The silica was then filtered, rinsed with several 10 mL portions of toluene, and subsequently combined with 0.09 grams of (1,3-MeBuCp)$_2$ZrMe$_2$ solution. The supported catalyst was allowed to sit at room temperature for 1 hr. The catalyst was filtered, rinsed with several 10 mL portions of toluene, and dried under a vacuum. The polymerization results are shown below in Table 5.

TABLE 5

|  |  | Comonomer Incorporation | Average Mw | Average Mn | Average PDI | Yield | Activity (gP/gCat*hr) |
|---|---|---|---|---|---|---|---|
| Comp. EX. 2 | 1 | 2.8 | 459215.9 | 209129 | 2.2 | 0.052 | 154.0 |
|  | 2 | 2.6 | 476909.6 | 229259 | 2.1 | 0.043 | 127.4 |
|  | 3 | 2.6 | 470312.3 | 237023 | 2 | 0.043 | 127.4 |
|  | average | 2.7 | 468813 | 225137 | 2.1 | 0.046 | 136.3 |

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for preparing a supported catalyst system for olefin polymerization, comprising:

combining a dialuminoxane with a support to form a treated catalyst support;

combining a halogen substituted aryl borane with the treated catalyst support at conditions sufficient to exchange one or more ligands on the dialuminoxane for one or more ligands on the halogen substituted aryl borane while on the support to form a supported activator;

combining the supported activator with one or more polymerization catalysts.

2. The method of claim 1, wherein the dialuminoxane is selected from the group consisting of tetraethyldialuminoxane, di-isobutylaluminoxane, di-octylaluminoxane, di-butylaluminoxane, di-t-butylaluminoxane, and mixtures thereof.

3. The method of claim 1, wherein the dialuminoxane is tetraethyldialuminoxane.

4. The method of claim 1, wherein the halogen substituted aryl borane comprises trisperfluorophenylborane.

5. The method of claim 1, wherein the supported activator is represented by the formula:

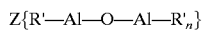

$$Z\{R'-Al-O-Al-R'_n\}$$

wherein Z is a metal/metalloid oxide or polymeric support, R' is independently selected from an alkyl group having 1–20 carbon atoms and an aryl halogen group, and n is 2.

6. The method of claim 5, wherein the aryl halogen group is a halogenated C$_6$ or higher carbon number polycyclic aromatic hydrocarbon or aromatic ring assembly in which two or more rings are joined directly to one another or together.

7. The method of claim 1, wherein at least one of the polymerization catalysts is represented by the formula:

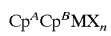

$$Cp^A Cp^B MX_n$$

wherein:

M is a metal atom;

Cp$^A$ and Cp$^B$ are each independently an unsubstituted or substituted cyclic ring group;

X is a leaving group; and n is zero or an integer from 1 to 4.

8. The method of claim 7, wherein Cp$^A$ and Cp$^B$ are each independently selected the group consisting of cyclopentadienyl, indenyl, combinations thereof, and derivatives thereof.

9. The method of claim 7, wherein Cp$^A$ is a cyclopentadienyl group and Cp$^B$ is an indenyl group.

10. The method of claim 7, wherein Cp$^A$ is a cyclopentadienyl group and Cp$^B$ is an indenyl group and the one or more polymerization catalysts comprises a bridging group A, bridging Cp$^A$ and Cp$^B$.

11. The method of claim 7, wherein Cp$^A$ is a cyclopentadienyl group and Cp$^B$ is a cyclopentadienyl group.

12. The method of claim 7, wherein M is zirconium and X is a methyl group.

13. The method of claim 7, wherein X is selected from the group consisting of amines, phosphones, ethers, carboxylates, dienes, hydrocarbyl radicals having from 1 to 20 carbon atoms, hydrides, halogens, combinations thereof, and derivatives thereof, and wherein n is 2.

14. The method of claim 1, wherein the one or more polymerization catalysts is selected from the group consisting of metallocenes, Group 15 containing compounds, phenoxide transition metal compositions, Group 5 or 6 metal imido complexes, bridged bis(arylamido) Group 4 compounds, derivatives thereof, and combinations thereof.

15. The method of claim 1, further comprising reacting the supported activator with one or more polymerization catalysts comprising $(1,3\text{-MeBuCp})_2\text{ZrMe}_2$.

16. The method of claim 1, wherein the dialuminoxane and the halogen substituted aryl borane are combined in an amount such that a molar ratio of aluminum atoms to boron atoms is from 5:1 to 50:1.

* * * * *